(12) United States Patent
Mori

(10) Patent No.: US 10,167,940 B2
(45) Date of Patent: Jan. 1, 2019

(54) DIFFERENTIAL DEVICE

(71) Applicant: MUSASHI SEIMITSU INDUSTRY CO., LTD., Toyohashi-Shi, Aichi (JP)

(72) Inventor: Hiroyuki Mori, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 155 days.

(21) Appl. No.: 15/286,791

(22) Filed: Oct. 6, 2016

(65) Prior Publication Data

US 2017/0102062 A1    Apr. 13, 2017

(30) Foreign Application Priority Data

Oct. 7, 2015  (JP) .................................. 2015-199797
Oct. 28, 2015 (JP) .................................. 2015-212103

(51) Int. Cl.
*F16H 48/40* (2012.01)
*F16H 48/08* (2006.01)

(52) U.S. Cl.
CPC ............. *F16H 48/40* (2013.01); *F16H 48/08* (2013.01)

(58) Field of Classification Search
CPC ......... F16H 48/40; F16H 48/08; F16H 57/037
See application file for complete search history.

(56) References Cited

U.S. PATENT DOCUMENTS

| 4,223,569 | A | 9/1980 | Koivunen et al. | |
| 6,729,991 | B1* | 5/2004 | Nishiji | B60K 17/346 |
| | | | | 475/204 |
| 6,964,629 | B2 | 11/2005 | Tsung | |
| 2012/0028750 | A1* | 2/2012 | Mizoguchi | F16H 48/08 |
| | | | | 475/230 |
| 2014/0179481 | A1* | 6/2014 | Fox | F16H 48/08 |
| | | | | 475/220 |
| 2017/0219077 | A1* | 8/2017 | Edler | F16H 41/28 |

FOREIGN PATENT DOCUMENTS

| JP | 07-301306 A | 11/1995 |
| JP | 2001-121980 A | 5/2001 |
| JP | 2004-332834 A | 11/2004 |
| JP | 2005-048903 A | 2/2005 |
| JP | 4803871 B2 | 10/2011 |
| JP | 4908458 B2 | 4/2012 |

\* cited by examiner

*Primary Examiner* — Mark J Beauchaine
(74) *Attorney, Agent, or Firm* — Carrier Blackman & Associates, P.C.; Joseph P. Carrier; Anne G. Sabourin

(57) ABSTRACT

An input member of a differential device includes a step portion in a side surface on a carrier side of an outer peripheral end portion of the input member, the step portion being recessed in a direction opposite to the carrier, extending to a radially-outer end surface of the outer peripheral end portion of the input member, and being capable of abutting against the carrier. Accordingly, when welding the input member and the carrier supporting a planetary gear, a degree of freedom of processing and welding workability are improved and the differential device is reduced in size. Moreover, grinding and finishing of a welding bead are unnecessary, and therefore manufacturing cost is suppressed.

16 Claims, 14 Drawing Sheets

DIFFERENTIAL DEVICE

BACKGROUND OF THE INVENTION

Field of the Invention

The present invention relates to a differential device which is suitable for a vehicle such as, for example, an automobile.

Description of the Related Art

FIG. 2b in U.S. Pat. No. 4,223,569, for example, discloses a conventional technique in a differential device, of integrally forming an input member (for example, a differential case) and a carrier supporting a planetary gear that is inputted with driving force.

Meanwhile, there has been known a technique, disclosed in FIGS. 1 to 3 of Japanese Patent No. 4908458, for example, of forming a planetary gear mechanism in which a carrier pivotally supporting planetary gears and a base member are joined together by inserting tip end portions of arm portions (2B) of the carrier into holes (9) provided to an intermediate portion in a radial direction of the base member (3) and welding together the tip end portions of the arm portions (2B) and peripheral portions of the holes (9) in the base member (3).

In a case where by simply combining the techniques of U.S. Pat. No. 4,223,569 and Japanese Patent No. 4908458 described above, the arm portions of the carrier which is a body separate from the input member are welded to the input member, welding portions between the arm portions and the input member are located in an intermediate portion in a radial direction of an end wall of the input member (base member) (that is, located on a radially inner side of an outer peripheral end of the input member). This poses a problem that a degree of freedom of moving a welding torch in welding is low and welding workability is poor.

SUMMARY OF THE INVENTION

The present invention has been made with the foregoing situation taken into consideration. An object of the present invention is to provide a differential device capable of solving the above-mentioned problem with a simple structure.

In order to achieve the object, a differential device according to the present invention, comprises: an input member capable of being joined to a carrier supporting a planetary gear inputted with driving force; a differential gear supported by the input member and being able to rotate with respect to the input member and revolve around a rotation center of the input member; and a pair of output gears each meshing with the differential gear, wherein the input member includes a step portion in a side surface on the carrier side of an outer peripheral end portion of the input member, the step portion being recessed in a direction opposite to the carrier, extending to a radially-outer end surface of the outer peripheral end portion and being capable of abutting against the carrier.

In the differential device according to the present invention, preferably, the step portion and the carrier are joined together by welding, and a welding portion between the step portion and the carrier is included in the outer peripheral end portion of the input member.

In the differential device according to the present invention, preferably, the input member includes a recessed portion adjacent to a radially-inner side of the step portion and deeper than the step portion, the carrier includes an arm portion between each adjacent pair of a plurality of the planetary gears arranged in a peripheral direction of the carrier, and the recessed portion extends peripherally outward of at least one end in the peripheral direction of the arm portion.

In the differential device according to the present invention, preferably, a plurality of the recessed portions are arranged at intervals in the peripheral direction.

In the differential device according to the present invention, preferably, as seen in a projection plane orthogonal to a rotation axis of each of the planetary gears, the step portion is formed in a position not overlapping the planetary gear.

In the differential device according to the present invention, preferably, a plurality of the step portions are arranged at intervals in the peripheral direction.

In the differential device according to the present invention, preferably, the input member includes a recessed portion adjacent to the radially-inner side of the step portion and deeper than the step portion, and the recessed portion is formed using a forging die.

In addition, preferably, the differential device according to the present invention, further comprises a differential gear support portion supporting the differential gear and supported in the input member, wherein $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and $Z1/Z2>2$ is satisfied, where Z1, Z2, d2 and PCD denote the number of teeth of each of the output gears, the number of teeth of the differential gear, a diameter of the differential gear support portion and a pitch cone distance, respectively.

In the differential device according to the present invention, preferably, $Z1/Z2 \geq 4$ is satisfied.

In the differential device according to the present invention, preferably, $Z1/Z2 \geq 5.8$ is satisfied.

According to the present invention, the input member includes the step portion in the side surface on the carrier side of the outer peripheral end portion of the input member, the step portion being recessed in the direction opposite to the carrier, extending to the radially-outer end surface of the outer peripheral end portion and being capable of abutting against the carrier. Therefore, when the input member is joined to the carrier by welding, a welding torch can be easily made to face a welded portion (that is, an abutment portion between the carrier and the step portion) from outside the input member in the radial direction. This makes it possible to secure a wider degree of freedom of moving the welding torch in an area outward of the input member in the radial direction and to enhance a degree of freedom of processing and welding workability. Furthermore, even if the side surface of the input member and the carrier are abutted against each other in the axial direction and joined together by welding, an overall width in the axial direction of a combination of the input member and the carrier can be reduced as much as possible. Thereby, a reduction of the size of the differential device can be achieved.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention will be described below based on the attached drawings.

Figure 1:
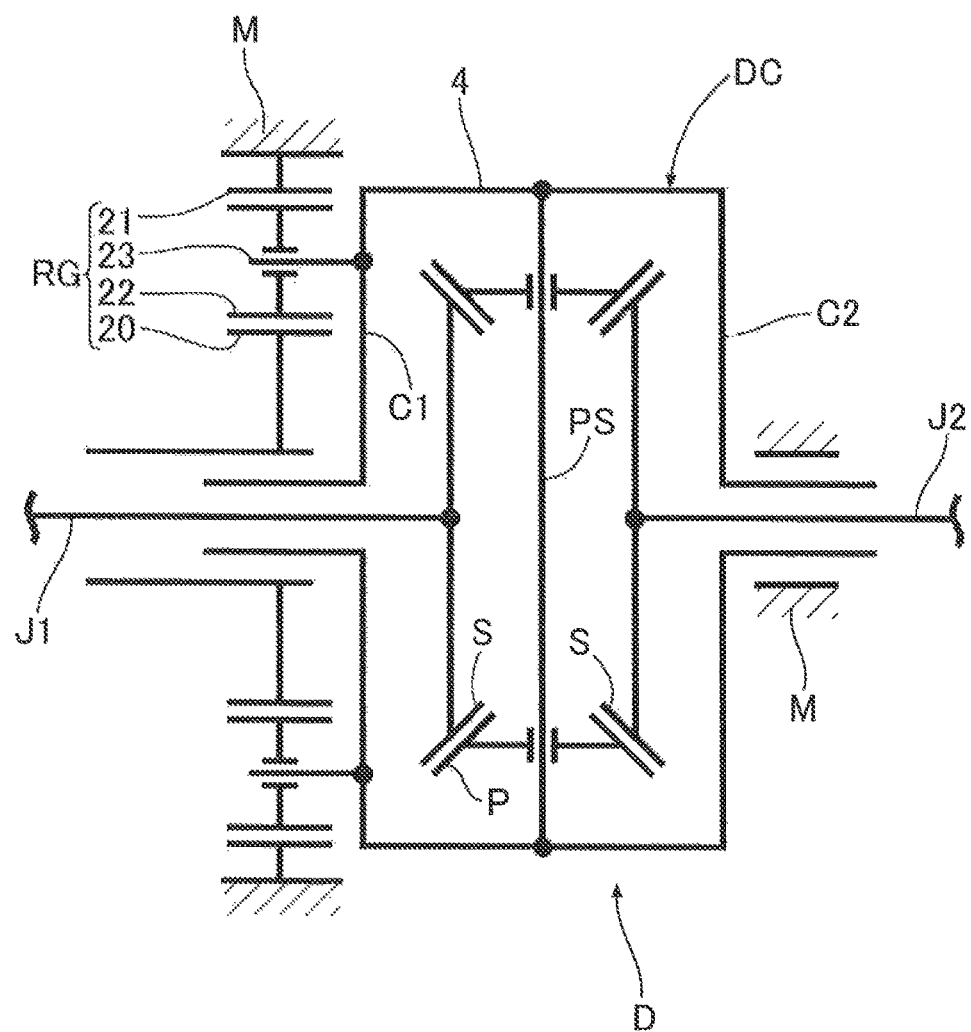
FIG. 1 is a schematic diagram of a differential device and a speed reduction gear mechanism according to a first embodiment of the present invention.

First of all, referring to FIGS. 1 to 5, a first embodiment of the present invention will be described. In FIG. 1, a differential device D is connected to an engine (not illustrated) as a power source mounted on an automobile via a speed reduction gear mechanism RG. The differential device D drives a pair of axles not illustrated and arranged in parallel in a vehicle width direction while allowing differential rotation between the pair of axles by distributively transmitting to output shafts J1, J2 rotational force which is transmitted from the engine to a differential case DC via the speed reduction gear mechanism RG, the output shafts J1, J2 being continuous respectively to the pair of axles. The differential device D is housed together with the speed reduction gear mechanism RG in, for example, a transmission case M placed beside the engine in a front portion of a vehicle body, in a way that the differential device D is arranged adjacent to the speed reduction gear mechanism RG. Incidentally, a power connection-disconnection mechanism and a forward-rearward travel switching mechanism (both not illustrated) which have been well-known are installed between the engine and the speed reduction gear mechanism RG. In addition, a rotation axis L of the differential case DC coincides with a center axis of the output shafts J1, J2.

Here, in the present specification, an "axial direction" means a direction along the center axis of the output shafts J1, J2 (namely, a rotation axis L of the differential case DC and side gears S) or an axis of each gear of the speed reduction gear mechanism RG. In addition, a "radial direction" means a radial direction of the differential case DC and the side gears S.

The speed reduction gear mechanism RG includes, for example: a sun gear 20 concentrically and rotatably fitted and supported on one end portion of the differential case DC; a ring gear 21 having a large diameter, concentrically surrounding the sun gear 20, and fixed to an inner wall of the transmission case M; a plurality of (four, for example) planetary gears 22 installed between the sun gear 20 and the ring gear 21 and meshing with them; and a carrier 23 pivotally supporting the planetary gears 22. The sun gear 20 is operatively connected to a crankshaft of the engine via an interlocking mechanism not illustrated. After inputted into the sun gear 20, power is transmitted sequentially through the planetary gears 22 and the carrier 23 to the differential case DC with the reduced speed.

The carrier 23 includes, for example: a carrier base 23b formed in a circular ring shape having a diameter smaller than that of the differential case DC; and a plurality of (four, for example) arm portions 23a integrally connected to an end surface of the carrier base 23b at intervals in a peripheral direction and extending in the axial direction. As seen in a projection plane orthogonal to a center axis L of the differential case DC, for example, each arm portion 23a is formed in a fan shape. A tip end portion of each arm portion 23a (more specifically, an end portion of the carrier 23 in the axial direction) is joined to the differential case DC by welding w as described later.

Each of the planetary gears 22 is, for example, placed in a space between the arm portions 23a adjacent to each other in the peripheral direction of the carrier 23. In addition, each planetary gear 22 is passed through and rotatably supported by a pivot axis 23j which extends longitudinally through the space. One end of the pivot axis 23j is fixed to the carrier base 23b, and the other end thereof is supported on the differential case DC.

The one end portion (a right end portion on FIG. 2, for example) of the differential case DC is rotatably supported by the transmission case M via a bearing 2. Meanwhile, on the other end portion side of the differential case DC, at least one of the sun gear 20, the carrier 23 and the output shaft J1 is rotatably supported on the transmission case M, although not illustrated. Thereby, a combination of the differential case DC and the carrier 23 which rotate integrally together is rotatably supported on the transmission case M.

In addition, a through-hole Ma to be inserted with each of the output shafts J1, J2 is formed in the transmission case M. A seal member 3 having an annular shape and sealing an interstice between an inner periphery of the through-hole Ma and an outer periphery of each of the output shafts J1, J2 is installed therebetween. Furthermore, an oil pan (not illustrated) which faces an inner space 1 of the transmission case M and holds a predetermined amount of lubricant oil is provided in a bottom portion of the transmission case M. In the inner space 1 of the transmission case M, the lubricant oil held in the oil pan is scraped up and splashed by rotation of movable elements of the speed reduction gear mechanism RG, the differential case DC and the like toward vicinities of rotational parts. This makes it possible to lubricate the mechanical moving parts existing inside and outside the differential case DC. Incidentally, the lubricant oil held in the oil pan may be sucked in by an oil pump (not illustrated) to be forcibly injected or sprayed toward specific parts in the inner space 1 of the transmission case M, for example toward the speed reduction gear mechanism RG and the differential case DC, or toward an inner wall of the transmission case M in peripheries of the speed reduction gear mechanism RG and the differential case DC.

The differential device D includes, for example: the differential case DC; a plurality of pinions P housed in the differential case DC; a pinion shaft PS housed in the differential case DC and rotatably supporting the pinions P; and a pair of side gears S housed in the differential case DC, meshing with the pinions P respectively from both the left and right sides and connected respectively to the pair of output shafts J1, J2. In this respect, each side gear S is an example of an output gear; each pinion P is an example of a differential gear; the pinion shaft PS is an example of a differential gear support portion; and the differential case DC is an example of an input member.

Each pinion P is housed and supported in the differential case DC, and is capable of rotating around an axis in the radial direction with respect to the differential case DC and revolving around a rotation center of the differential case DC in accordance with a rotation of the differential case DC.

The differential case DC includes, for example: a case portion 4 having a short cylindrical shape (a tubular shape) and supporting the pinion shaft PS such that the case portion 4 is capable of rotating with the pinion shaft PS; and a pair of cover portions C1, C2 respectively covering outer sides of the pair of side gears S and rotating integrally with the case portion 4.

One of the pair of cover portions C1, C2, the first cover portion C1 on the speed reduction gear mechanism RG side is, for example, formed integrally with the case portion 4 and connected to the carrier 23 by, for example, welding w. Moreover, the second cover portion C2 is detachably joined to the case portion 4 by joining means such as bolts B or the like. Incidentally, as the joining means of the second cover portion C2, appropriate joining means other than the bolts B, for example caulking means, adhering means, welding means and the like may be adopted. In addition, like the second cover portion C2, the first cover portion C1 may be formed separately from the case portion 4 and joined to the case portion 4 by the joining means such as the bolts B or the like.

Each of the first and second cover portions C1, C2 includes, for example: a boss portion Cb which concentrically surrounds a shaft portion Sj described later of the side gear S, in which the shaft portion Sj is rotatably fitted and supported and being formed in a cylindrical shape; and a side wall portion Cs formed in a plate shape and an annular shape and having an outer side surface all or most of which is a flat surface orthogonal to the rotation axis L of the differential case DC, the side wall portion Cs being integrally connected to an inner end in an axial direction of the boss portion Cb. An outer peripheral end portion of the side wall portion Cs is integrally or detachably connected to the case portion 4. Since the side wall portion Cs is the flat surface as described above, the side wall portion Cs is inhibited from protruding outward in the axial direction to a large extent, and accordingly it is advantageous in making the differential device D flat in the axial direction.

An outer peripheral surface of the output shaft J1 is relatively rotatably fitted directly to an inner peripheral surface of the boss portion Cb of the one cover portion (in this embodiment, the first cover portion C1). A recessed groove 8 is formed in the inner peripheral surface of the boss portion Cb, the recessed groove 8 having a spiral shape and being capable of forcedly feeding the lubricant oil from an outer end to an inner end in the axial direction of the boss portion Cb in accordance with relative rotation between the output shaft J1 and the boss portion Cb. Meanwhile, a recessed groove 8' is formed in an inner peripheral surface of the boss portion Cb of the other cover portion (in this embodiment, the second cover portion C2), the recessed groove 8' having a spiral shape and being capable of forcedly feeding the lubricant oil from an outer end to an inner end in the axial direction of the boss portion Cb in accordance with relative rotation between the boss portion Cb of the other cover portion and the shaft portion Sj of the side gear S on the same side as the other cover portion (more specifically, the boss portion Cb of the second cover portion C2).

The pinion shaft PS is, for example, arranged inside the differential case DC so as to be orthogonal to the rotation axis L of the differential case DC, and both end portions of the pinion shaft PS are respectively removably inserted through a pair of support through-holes 4a which are provided to the case portion 4 having the tubular shape, the support through-holes 4a being located on one diametric line of the case portion 4. In addition, the pinion shaft PS is fixed to the case portion 4 using a retaining pin 5 which penetrates through one end portion of the pinion shaft PS and is attached to the case portion 4. The retaining pin 5 is prevented from coming off the case portion 4 by abutting an outer end of the retaining pin 5 against the second cover portion C2 bolted to the case portion 4.

Incidentally, the embodiment shows the differential device D whose pinion shaft PS is formed in a linear rod shape with the two pinions P respectively supported by both end portions of the pinion shaft PS. Instead, the differential device D may include three or more pinions P. In this case, the pinion shaft PS is formed in a shape of crossing rods such that rods extend radially from the rotation axis L of the differential case DC in three or more directions corresponding to the three or more pinions P (for example, in a shape of a cross when the differential device D includes four pinions P), and tip end portions of the pinion shaft PS support the pinions P, respectively. Furthermore, the case portion 4 is divided into a plurality of case elements such that the end portions of the pinion shaft PS can be attached to and supported in the divided case elements.

Figure 2:
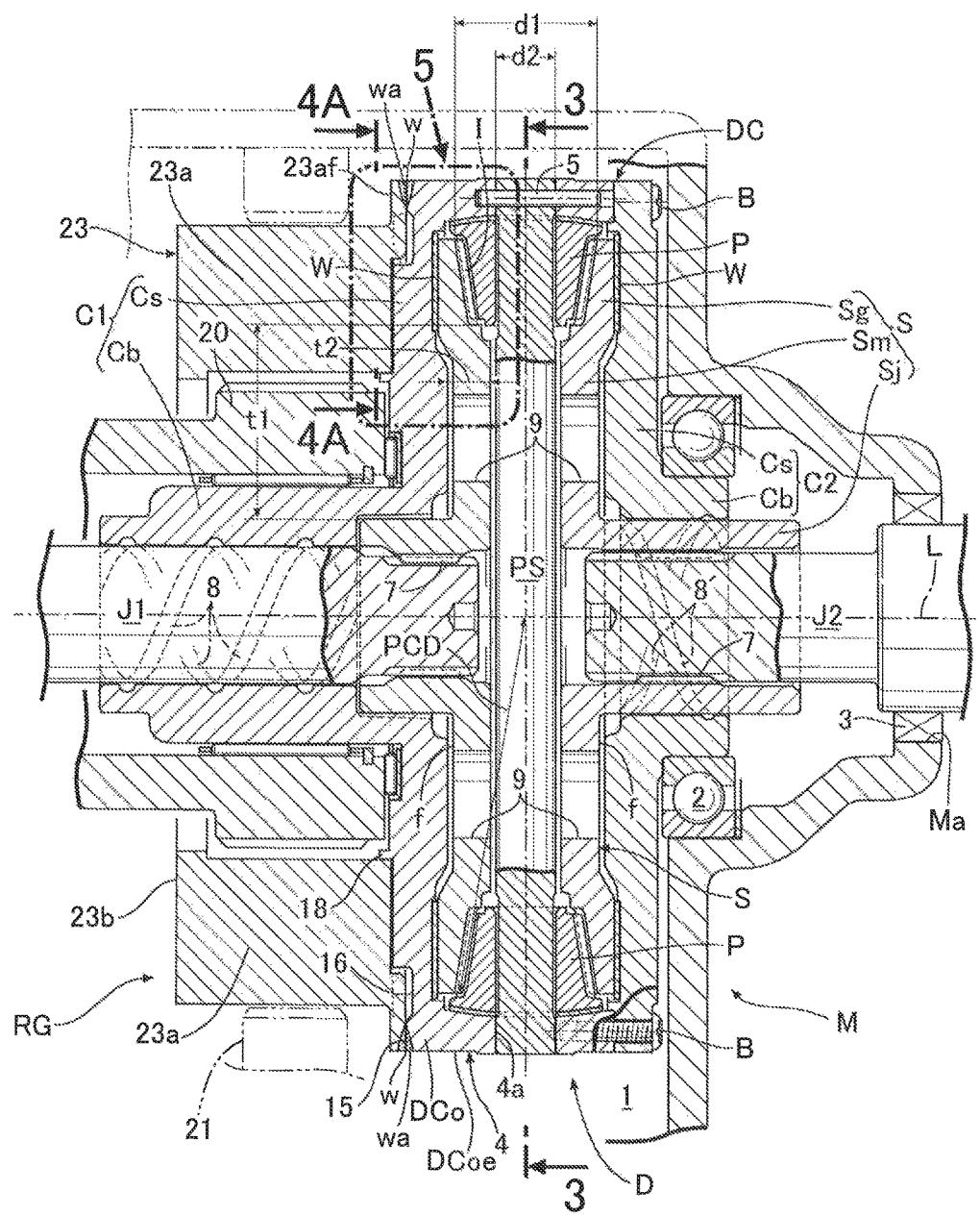
FIG. 2 is a longitudinal sectional view of a main part in the differential device and the speed reduction gear mechanism according to the first embodiment of the present invention.
Figure 3:
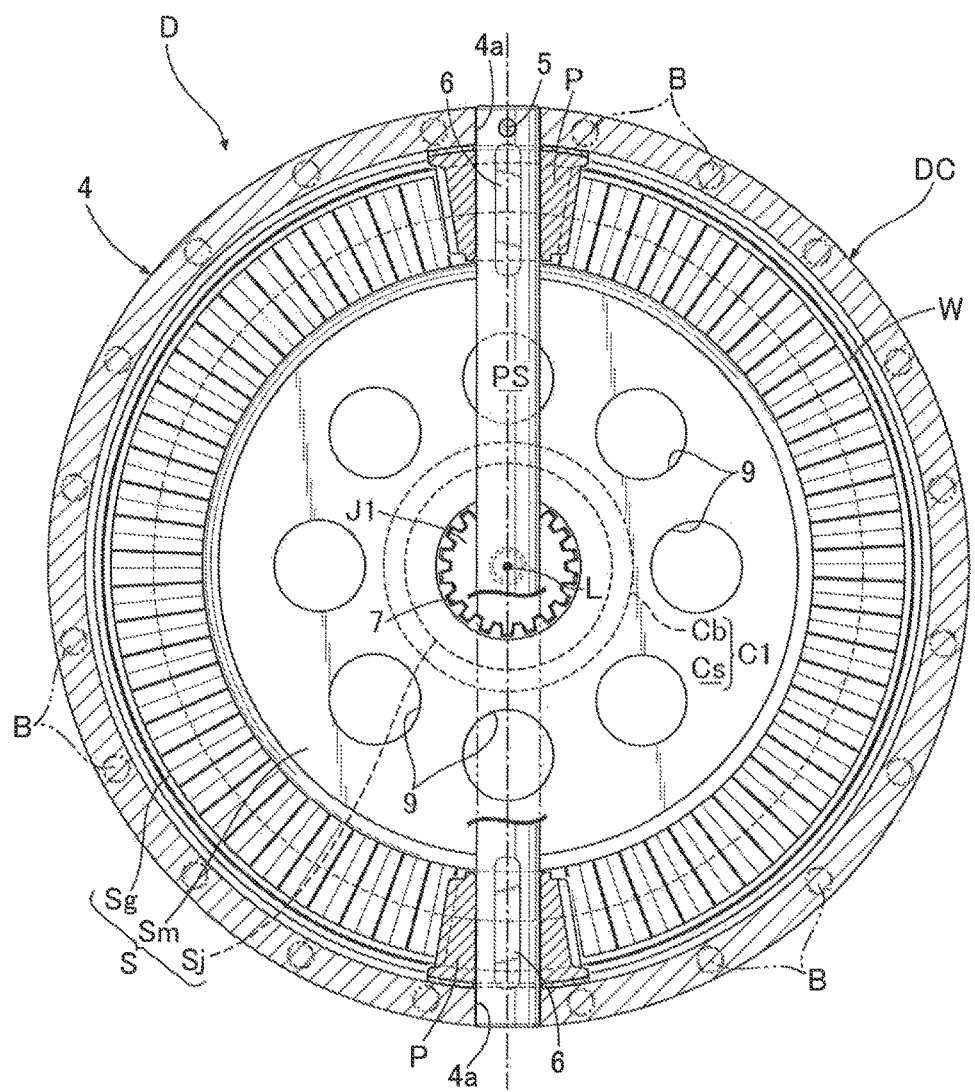
FIG. 3 is a cross sectional view of the differential device according to the first embodiment of the present invention as seen from a central portion of the differential device toward a first cover portion.

Moreover, each pinion P may be directly fitted to the pinion shaft PS, or the pinion P may be fitted to the pinion shaft PS via bearing means such as a bearing bush and the like. Incidentally, as shown in FIGS. 2 and 3, the pinion shaft PS may be formed in a shape of a shaft whose diameter is substantially equal throughout its whole length, or formed in a shape of a stepped shaft. Furthermore, in each fitting surface of the pinion shaft PS, which is fitted to the pinion P, a cutout surface 6 having a flat shape (see FIG. 3) is formed to secure a sufficient flow of the lubricant oil to the fitting surface. Thus, an oil passage through which the lubricant oil can flow is secured between the cutout surface 6 and the inner peripheral surface of the pinion P.

Meanwhile, the pinions P and the side gears S are each formed as, for example, a bevel gear. In addition, each pinion P as a whole and each side gear S as a whole, including their tooth portions, are formed by plastic working such as forging and the like. For these reasons, their tooth portions with an arbitrary gear ratio can be precisely formed without restriction in machining work in the case where the tooth portions of the pinions P and the side gears S are formed by cutting work, and the like. Incidentally, as the pinions P and the side gears S, other types of gears may be used instead of the bevel gear. For example, a face gear may be used for the side gears S, while a spur gear or a helical gear may be used for the pinions P.

In addition, the pair of side gears S each include, for example: the shaft portion Sj to which an inner end portion of the corresponding one of the pair of output shafts J1, J2 is spline-fitted as at 7 and being formed in a cylindrical shape; a tooth portion Sg formed in an annular shape and separated radially outward from the shaft portion Sj, the tooth portion Sg having a tooth surface in mesh with the pinions P; and an intermediate wall portion Sm formed in a flat ring plate shape extending radially outward from the inner end portion of the shaft portion Sj to an inner peripheral end portion of the tooth portion Sg. The intermediate wall portion Sm integrally connects the shaft portion Sj and the inner peripheral end portion of the tooth portion Sg. In addition, in a back surface f of each of the side gear S, a back surface portion fg of the tooth portion Sg protrudes outward in the axial direction beyond a back surface portion fm of the intermediate wall portion Sm.

Incidentally, the shaft portions Sj of the side gears S are directly and rotatably fitted in, for example, boss portions Cb of the first and second cover portions C1, C2, respectively, but may be rotatably fitted in the boss portions Cb of the first and second cover portions C1, C2 via bearings, respectively.

In at least one of the left and right side gear S (in this embodiment, in both the left and right side gears S), a plurality of penetrating oil passages 9 are formed at intervals in a peripheral direction in the intermediate wall portion Sm, the penetrating oil passages 9 penetrating through the intermediate wall portion Sm so as to transverse the intermediate wall portion Sm in the axial direction. Thus, inside the differential case DC, the lubricant oil smoothly flows between an inner side and an outer side of the side gear S via the penetrating oil passages 9. Incidentally, although not illustrated, a plurality of through holes allowing the flow of the lubricant oil inside and outside the differential case DC may be provided in the side wall portion Cs of at least one of the first and second cover portions C1, C2 so as to be arranged at intervals in the peripheral direction.

In addition, the back surface portion fg of the tooth portion Sg of the side gear S are rotatably abutted against and supported on the inner side surface of the side wall portion Cs of each of the first and second cover portions C1, C2, namely, a surface of the side wall portion Cs facing the back surface f of the side gear S, via a washer W. Here, the washer W is fitted and retained in a washer retaining groove 10 having an annular shape and formed in at least one of the inner side surface of the side wall portion Cs of each of the first and second cover portions C1, C2 and the back surface portion fg of the tooth portion Sg of the corresponding side gear S (in this embodiment, the inner side surface of the side wall portion Cs).

Furthermore, corresponding to that the back surface portion fg of the tooth portion Sg of the side gear S protrudes further outward in the axial direction than the back surface portion fm of the intermediate wall portion Sm as described above, the inner side surface of the side wall portion Cs of each of the first and second cover portions C1, C2 are formed such that a part of the side wall portion Cs corresponding to the back surface portion fm of the intermediate wall portion Sm protrudes further inward in the axial direction (that is, is thicker in the axial direction) than a part of the side wall portion Cs corresponding to the back surface portion fg of the tooth portion Sg. This can effectively enhance support rigidity of the side wall portions Cs of the first and second cover portions C1, C2 the with respect to the side gears S.

Figure 5:
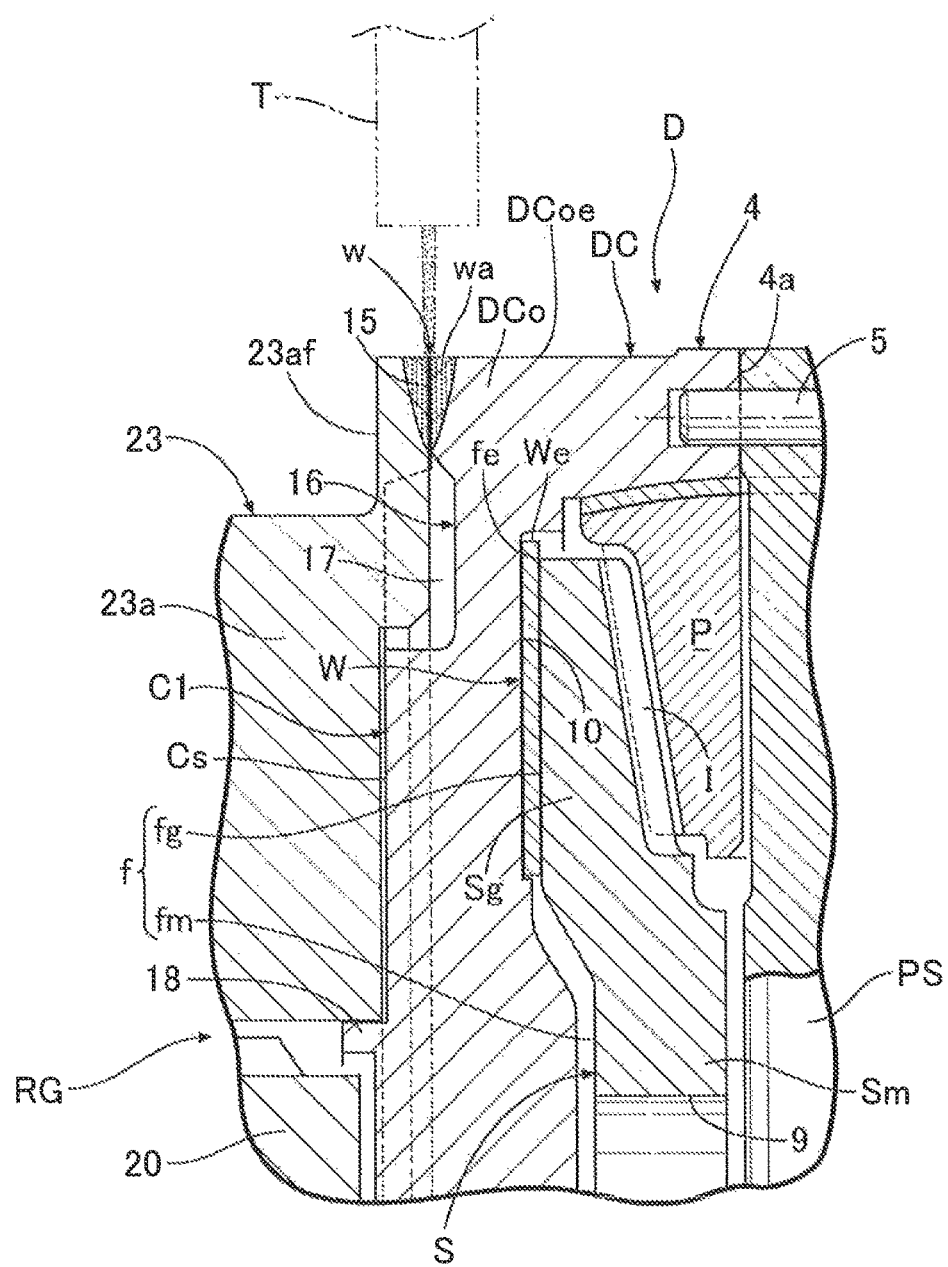
FIG. 5 is an enlarged sectional view of a section indicated with an arrow 5 in FIG. 2.

Meanwhile, as shown in FIG. 5, in the back surface f of each side gear S, an outermost peripheral end fe of an abutment surface which abuts against the washer W is located in the same position in the radial direction of the side gear S as an outermost peripheral end of the meshing portion I between the side gear S and the pinion P, and an outer peripheral end portion We of the washer W extends further radially outward than the outermost peripheral end fe of the abutment surface.

Figure 4A:
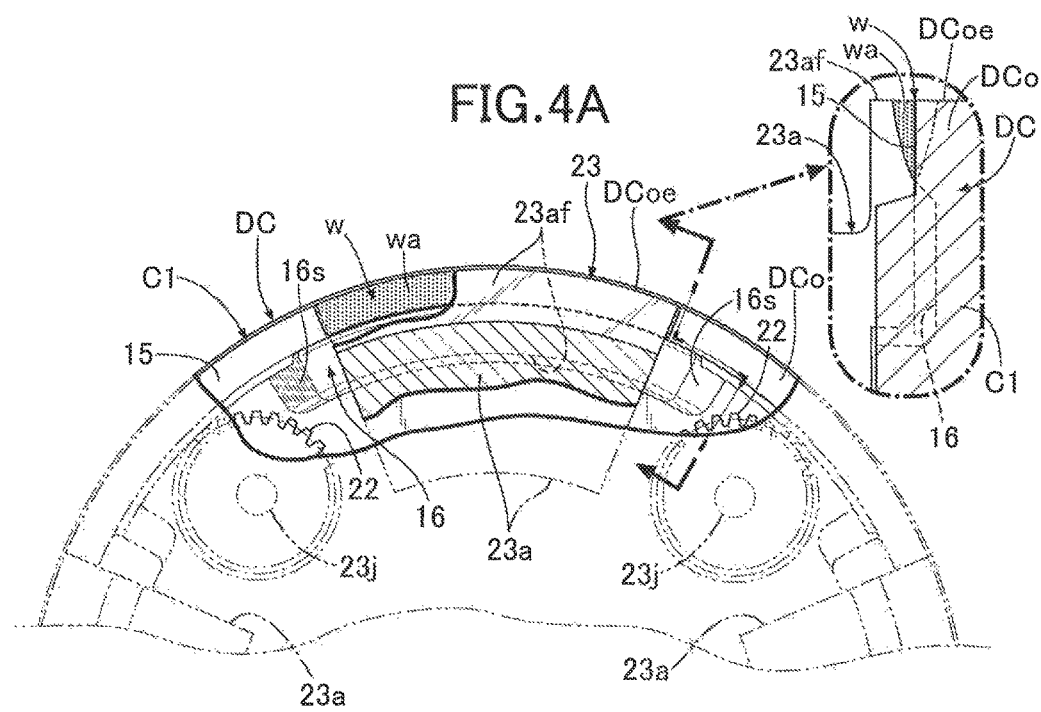
FIG. 4A is a sectional view taken along a 4A-4A line in FIG. 2
Figure 4B:
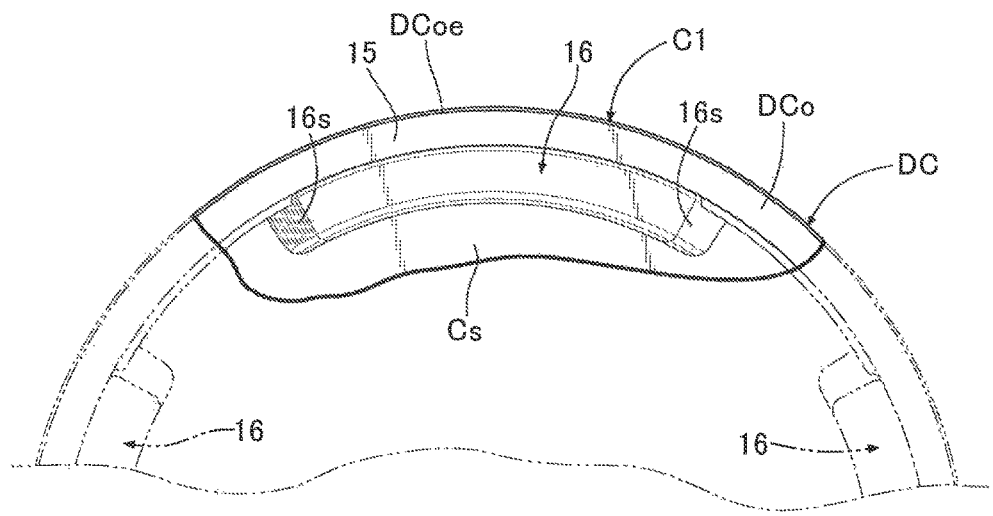
FIG. 4B is a partial sectional view showing an unwelded state of a carrier to a differential case (the first cover portion) in FIG. 4A.

Next, referring to FIGS. 4A, 4B and 5, specific descriptions will be provided for a structure for welding the carrier 23 and the differential case DC. In a side surface on the carrier 23 side of an outer peripheral end portion DCo of the differential case DC (the first cover portion C1, more specifically), for example a step portion 15 having an annular shape is provided in a recess shape, the step portion 15 being recessed in a direction opposite to the carrier 23 and extending to a radially-outer end surface DCoe of the outer peripheral end portion DCo of the differential case DC. As clearly shown in FIG. 4A, for example as seen in a projection plane orthogonal to rotation axes of the planetary gears 22, the step portion 15 is formed in a position not overlapping the planetary gears 22, that is, in a position further radially outward in the first cover portion C1 than the planetary gears 22. Incidentally, FIGS. 4A, 4B and 5 show a form of the step portion 15 before a welding step described later.

In this specification, the outer peripheral end portion DCo of the differential case DC (the first cover portion C1, more specifically) is a concept covering not only the radially-outer end surface DCoe of the differential case DC, but also a predetermined area which is located inward of the radially-outer end surface DCoe in the radial direction and near the radially-outer end surface DCoe.

Moreover, in the side surface on the carrier 23 side of the first cover portion C1, for example, a plurality of recessed portions 16 each having an arc shape are provided in a recess shape so as to be arranged at intervals in the peripheral direction, the recessed portions 16 being adjacent to a radially-inner side of the step portion 15 and deeper than the step portion 15. The recessed portions 16 are formed in positions corresponding to the plurality of arm portions 23a of the carrier 23, respectively. Furthermore, each recessed portion 16 extends outward of at least one end (both ends, in the embodiment) in the peripheral direction of the tip end portion (that is, a protrusion 23af described later) of the corresponding arm portion 23a of the carrier 23. In addition, the outwardly-extending end portions in the peripheral direction of each recessed portion 16 are formed as gentle slopes 16s which gently rise.

Moreover, a positioning protrusion 18 having an annular shape is integrally protruded from the side surface on the carrier 23 side of the first cover portion C1, the positioning protrusion 18 being engaged with inner peripheral surfaces of the plurality of arm portions 23a of the carrier 23. The positioning of the carrier 23 to the differential case DC in the radial direction is easily and appropriately achieved by engaging the inner peripheral surfaces of the plurality of arm portions 23a with the positioning protrusion 18.

Meanwhile, for example, the protrusions 23af each having a flange shape are integrally formed on an end surface in the axial direction of the carrier 23, that is, tip end surfaces of the arm portions 23a. The protrusions 23af project toward the differential case DC beyond the tip end surfaces of the arm portions 23a in the axial direction, and project outward of radially-outer peripheral surfaces of the arm portions 23a in the radial direction. In a tip end surface in the axial direction of each protrusion 23af, a radially-inner-side portion faces a bottom surface of the corresponding recessed portion 16 across a small gap 17 corresponding to the depth of the recessed portion 16. A radially-outer-side portion in the tip end surface in the axial direction of each protrusion 23af abuts against the step portion 15. The carrier 23 is joined to the differential case DC by welding as at w the abutment portion between the radially-outer-side portion and the step portion 15 by means of a laser torch T (see FIG. 5). A welding portion wa between the step portion 15 and the carrier 23 (the protrusions 23af, specifically) is placed such that the welding portion wa is included in the outer peripheral end portion DCo of the differential case DC. In addition, in the embodiment, a radially-outer end surface of each protrusion 23af is formed flush with and continuous to a portion, which is adjacent to the step portion 15, of the radially-outer end surface DCoe of the outer peripheral end portion DCo in the differential case DC. Nevertheless, a slight level difference may be set between the step portion 15 and the portion adjacent to the step portion 15.

As for the first cover portion C1 of the differential case DC, for example at least the step portion 15 and the recessed portions 16 are formed by forging using a forging die corresponding to the forms of the step portion 15 and the recessed portions 16.

Next, descriptions will be provided for an operation of the first embodiment. In the differential device D of this embodiment, in a case where the differential case DC receives rotational force from the engine via the speed reduction gear mechanism RG, when the pinion P revolves around the rotation axis L of the differential case DC together with the differential case DC, without rotating around the pinion shaft PS, the left and right side gears S are rotationally driven at the same speed from the differential case DC via the pinions P, and driving forces of the side gears S are evenly transmitted to the left and right output shafts J1, J2. Meanwhile, when a difference in rotational speed occurs between the left and right output shafts J1, J2 due to turn traveling or the like of the automobile, the pinion P revolves around the rotation axis L of the differential case DC while rotating around the pinion shaft PS. Thereby, the rotational driving force is transmitted from the pinion P to the left and right side gears S while allowing differential rotations. The above is the same as the operation of the conventional differential device.

Meanwhile, in the embodiment, the step portion 15 is provided in a recess shape in the side surface on the carrier 23 side of the outer peripheral end portion DCo of the differential case DC, the step portion 15 being recessed in the direction opposite to the carrier 23, extending to the radially-outer end surface DCoe of the outer peripheral end portion DCo of the differential case DC, and abutting against the end portion in the axial direction of the carrier 23 (that is, the protrusions 23af of the tip end portions of the plurality of arm portions 23a). Furthermore, in a state where the step portion 15 and the end portion in the axial direction of the carrier 23 (the protrusions 23af, more specifically) are abutted against each other so as to be butted each other, the abutment portion is welded as at w. Thereby, the differential case DC (the first cover portion C1, more specifically) and the speed reduction gear mechanism RG (the carrier 23, more specifically) are joined together. At this time, the abutment portion between the step portion 15 and the end portion in the axial direction of the carrier 23 (the protrusions 23af, more specifically) forms the welding portion wa.

The welding is performed, for example, as shown with chain lines in FIG. 5, by irradiating a radially-outer end of the abutment portion with a laser from the laser torch T for welding placed outward of the first cover portion C1 in the radial direction and by slowly rotating any one of the first cover portion C1 and the laser torch T (for example, the laser torch T) relative to the other (for example, the first cover portion C1) around the rotation axis L of the differential case DC. Thereby, using energy of the laser, the step portion 15 and the end portion in the axial direction of the carrier 23, that is, the tip end surfaces in the axial direction of the protrusions 23af, can be joined together by the welding w.

According to the embodiment, as described above, the side surface on the carrier 23 side of the outer peripheral end portion DCo of the differential case DC (the first cover portion C1, more specifically) includes the step portion 15, the step portion 15 being recessed in the direction opposite to the carrier 23, extending to the radially-outer end surface DCoe of the outer peripheral end portion DCo of the differential case DC (the first cover portion C1, more specifically), and being able to abut against the protrusions 23af of the carrier 23. Thus, when the welding is performed, the laser torch T for welding can be easily made to face a welded portion (that is, the outer end of the abutment portion described above) from outside the differential case DC in the radial direction. This makes it possible to secure a wider degree of freedom of moving the laser torch T for welding in an area radially outward of the differential case DC (the first cover portion C1, more specifically) than that of conventional techniques, and to make a degree of freedom of processing and welding workability higher than those of the conventional techniques.

Furthermore, according to the embodiment, the step portion 15 and the carrier 23 are joined together by the welding w, and the welding portion wa between the step portion 15 and the carrier 23 is included in the outer peripheral end portion DCo of the differential case DC. Thus, when the welding is performed, the laser torch T for welding can be easily made to face the welded portion from radially outside the differential case DC (the first cover portion C1, more specifically). This makes it possible to secure a wider degree of freedom of moving the laser torch T for welding in the area radially outward of the differential case DC (the first cover portion C1, more specifically), and to further improve the degree of freedom of processing and the welding workability. Moreover, since the welding portion wa is included in the outer peripheral end portion DCo of the differential case DC (the first cover portion C1, more specifically), it is possible to avoid or reduce influence of welding heat (for example, thermal strain) on a portion of the differential case DC (the first cover portion C1, more specifically) supporting the back surface of the corresponding side gear S (a corresponding abutting surface of the differential case DC which abuts against the washer W, in the embodiment). In addition, finishing processing in consideration of the influence of the heat is no longer necessary. Besides, there is no possibility that a welding bead and peripheral parts (the ring gear 21 of the speed reduction gear mechanism RG, for example) interfere with each other. Thus, grinding and finishing of the welding bead are no longer necessary, and therefore manufacturing costs can be reduced effectively.

In addition, according to the embodiment, the side surface on the carrier 23 side of the first cover portion C1 includes the recessed portions 16 each having the arc shape, the recessed portions 16 being adjacent to the radially-inner side of the step portion 15 and deeper than the step portion 15. Each recessed portion 16 extends outward of at least one end (the both ends, in the embodiment) of the corresponding arm portion 23a (the tip end portion of the arm portion 23a, more specifically (the protrusion 23af of the arm portion 23a, in the embodiment)) in the peripheral direction of the carrier 23. For these reasons, when the welding is performed, a gas generating in a periphery of the welding portion can be appropriately discharged through each recessed portion 16 to the outside. This can contribute to enhancement in the quality of the welding.

Moreover, according to the embodiment, the arrangement of the plurality of recessed portions 16 at intervals in the peripheral direction makes it possible to minimize a decrease in strength of the differential case DC due to the providing of the recessed portions 16 to the differential case DC. Thereby, it is possible to reduce thickness and weight of the differential case DC (the first cover portion C1, more specifically) thinner and lighter in weight while securing the strength of the differential case DC (the first cover portion C1, more specifically).

In addition, according to the embodiment, as seen in the projection plane orthogonal to the rotation axes of the planetary gears 22, the step portion 15 is formed in the position not overlapping the planetary gears 22. Thus, it is possible to avoid a reduction in a sliding support surface of the differential case DC (the first cover portion C1, more specifically) which slides over the planetary gears 22 by the providing of the step portion 15. Accordingly, it is possible to sufficiently secure an area of the sliding support surface of the differential case DC (that is, an area of a portion at which the differential case DC receives pressure from the planetary gears 22).

Moreover, for the differential case DC (the first cover portion C1, more specifically) according to the embodiment, at least the step portion 15 and the recessed portions 16 are formed by forging using a forging die. In this case, a cutting process of forming the step portion 15 and the recessed portions 16 is no longer necessary. Thereby, a reduction of working steps can be achieved.

Furthermore, according to the embodiment, the step portion 15, formed in the side surface of the outer peripheral end portion DCo of the differential case DC (the first cover portion C1, more specifically) and recessed in the direction opposite to the carrier 23, serves as an abutment surface at which the differential case DC (the first cover portion C1, more specifically) abuts against the carrier 23 (that is, a welded surface). Thus, although the side surface of the outer peripheral end portion DCo of the differential case DC (the first cover portion C1, more specifically) and the end portion in the axial direction of the carrier 23 are butted together in the axial direction and joined together by the welding w, an overall width in the axial direction of the outer peripheral end portion of the combination of the differential case DC (the first cover portion C1, more specifically) and the carrier 23 can be reduced as much as possible. Thereby, a reduction of the size of the differential device D can be achieved.

Further, in the embodiment, each side gear S includes the intermediate wall portion Sm having a flat ring plate shape and connecting between the shaft portion Sj on an inner peripheral side of the side gear S and the tooth portion Sg on an outer peripheral side of the side gear S, the tooth portion Sg being separated outward from the shaft portion Sj in a radial direction of the side gear S. The width t1 in the radial direction of the intermediate wall portion Sm is larger than the maximum diameter d1 of each pinion P. For these reasons, the diameter of each side gear S can be made sufficiently larger than the diameter of the pinion P, so that the number Z1 of teeth of the side gear S can be made sufficiently larger than the number Z2 of teeth of the pinion P, and it is possible to reduce load burden on the pinion shaft PS in torque transmission from the pinions P to the side gears S. Thus, it is possible to decrease the effective diameter d2 of the pinion shaft PS, and accordingly to decrease a width (diameter) of each pinion P in the axial direction of the output shafts J1, J2.

Furthermore, in this manner, load burden on the pinion shaft PS is reduced, and reaction force applied to the side gears S decreases. In addition, the back surfaces f of the side gears S (particularly, the back surface portions fg located on the back surface side of the meshing portions I between the side gears S and the pinions P) are supported on the side wall portions Cs of the first and second cover portions C1, C2 via the washers W. Therefore, it is easy to secure the rigidity strength needed for each of the side gears S even if the intermediate wall portion Sm is thinned. That is, it is possible to sufficiently thin the intermediate wall portion Sm of the side gear S while securing the support rigidity with respect to the side gear S.

Moreover, in the embodiment, since the maximum thickness t2 of the intermediate wall portion Sm of the side gear S is formed much smaller than the effective diameter d2 of the pinion shaft PS whose diameter can be made smaller, the further thinning of the intermediate wall portion Sm of the side gear S can be achieved.

Besides, in the embodiment, since the side wall portion Cs of each of the first and second cover portions C1, C2 is formed in a flat plate shape such that the outer side surface of the side wall portion Cs is the flat surface orthogonal to the rotation axis L of the differential case DC, the thinning of the side wall portion Cs itself of each of the first and second cover portions C1, C2 can be achieved. Moreover, in the back surface f of the side gear S, the back surface portion fg of the tooth portion Sg protrudes further outward in the axial direction than the back surface portion fm of the intermediate wall portion Sm. This makes it possible to form the intermediate wall portion Sm of the side gear S as thin as possible while sufficiently securing rigidity of the tooth portion Sg of the side gear S, accordingly it is possible to achieve the reduction in the weight of the differential device D and the reduction in the thickness of the differential device D in the axial direction.

As a result of these, according to the embodiment, the width of the differential device D as a whole can be sufficiently decreased in the axial direction of the output shafts J1, J2 while securing as approximately the same strength (for example, static torsion load strength) and as approximately the same amount of maximum torque transmission compared with the conventional differential device. This makes it possible to easily incorporate the differential device D in a transmission system, which is under many layout restrictions around the differential device D, with great freedom and no specific difficulties, and is extremely advantageous in reducing the size of the transmission system of the differential device D.

Figure 6:
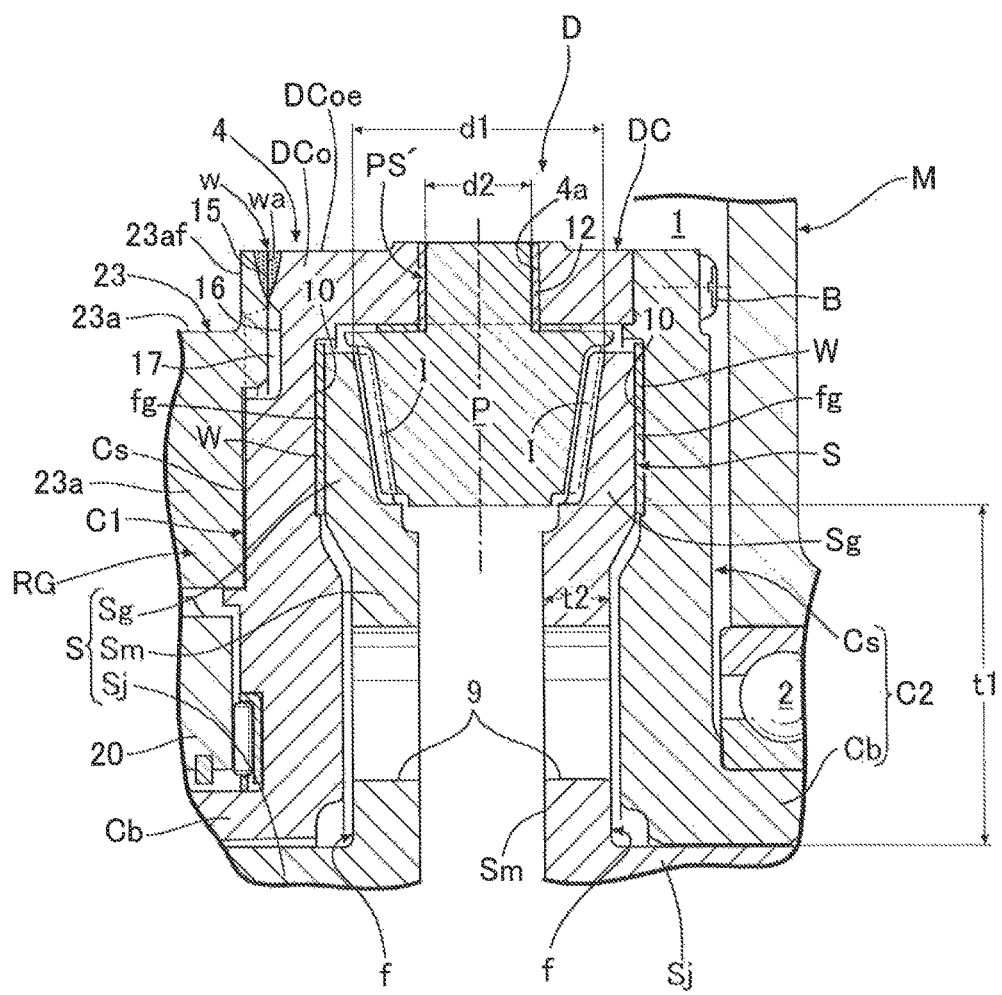
FIG. 6 is an enlarged sectional view showing a main part of a second embodiment of the present invention.

Next, using FIG. 6, descriptions will be provided for a second embodiment of the present invention. Incidentally, constituent components which are the same as those of the first embodiment will be denoted by the same reference signs, and detailed descriptions for such constituent components will be omitted.

Although the first embodiment has shown the differential device which uses the long pinion shaft PS as the support portion supporting the pinions P (that is, a differential gear support portion), this second embodiment shows a differential device which is configured such that the support portion supporting the pinions P (that is, the differential gear support portion) is formed from a support shaft PS' coaxially and integrally connected to a large diameter-side end surface of the pinion P. According to this configuration, it is unnecessary to provide in the pinion P the through-hole fitted with the pinion shaft PS, and thus it is possible to reduce the diameter (the width in the axial direction) of the pinion P by an amount corresponding to the through-hole. Thereby, the differential device D can be further thinned in the axial direction of the output shafts J1, J2. In other words, in a case where the pinion shaft PS penetrates through the pinion P, it is necessary to form in the pinion P the through-hole in a size corresponding to the diameter of the pinion shaft PS. In contrast, in a case where the support shaft PS' is integrated with the end surface of the pinion P, it is possible to reduce the diameter of the pinion P (the width of the pinion P in the axial direction of the output shafts J1, J2) without depending on an outer diameter (that is, the effective diameter d2) of the support shaft PS'.

Furthermore, as bearing means, a bearing bush 12 is installed between an outer peripheral surface of the support shaft PS' and an inner peripheral surface of a corresponding support through-hole 4a provided to the outer peripheral wall, that is, the case portion 4 having the tubular shape, of the differential case DC (more specifically, the first cover portion C1). The bearing bush 12 is configured to allow relative rotation between the outer peripheral surface of the support shaft PS' and the inner peripheral surface of the support through-hole 4a. Incidentally, a bearing such as a needle bearing and the like may be used as the bearing means. Otherwise, the bearing may be omitted so that the support shaft PS' may be directly fitted in the support through-hole 4a of the differential case DC.

The second embodiment has the same configuration as the first embodiment, except for different parts from the first embodiment as described above. Thus, the second embodiment brings about the same effects as the first embodiment, in addition to effects obtained by the difference of the second embodiment from the first embodiment. In other words, as for the effects resulting from the structure for welding the first cover portion C1 of the differential case DC and the carrier 23 of the speed reduction gear mechanism RG together, the second embodiment can bring about the same effects as the first embodiment.

Meanwhile, in the conventional differential devices exemplified in U.S. Pat. No. 4,223,569 mentioned above, Japanese Patent No. 4803871 and Japanese Patent Application KOKAI Publication No. 2002-364728, the number Z1 of teeth of the side gear (output gear) and the number Z2 of teeth of the pinion (differential gear) are generally set at 14 and 10, 16 and 10, or 13 and 9, respectively, as shown in Japanese Patent Application KOKAI Publication No. 2002-364728, for example. In these cases, the number-of-teeth ratios Z1/Z2 of the output gears to the differential gears are 1.4, 1.6 and 1.44, respectively. In addition, other publicly-known examples of the combination of the number Z1 of teeth and the number Z2 of teeth for conventional differential devices include 15 and 10, 17 and 10, 18 and 10, 19 and 10, and 20 and 10. In these cases, the number-of-teeth ratios Z1/Z2 are at 1.5, 1.7, 1.8, 1.9 and 2.0, respectively.

On the other hand, nowadays, there is an increase in the number of transmission systems which are under layout restrictions around their respective differential devices. Accordingly, the market demands that differential devices be sufficiently reduced in width (i.e., thinned) in the axial direction of their output shafts while securing the gear strength for the differential devices. However, the structural forms of the conventional existing differential devices are wide in the axial direction of the output shafts, as apparent from the gear combinations leading to the above-mentioned number-of-teeth ratios. This makes it difficult to satisfy the market demand.

With this taken into consideration, an attempt to find a concrete configuration example of the differential device D which can be sufficiently reduced in width (i.e., thinned) in the axial direction of the output shafts while securing the gear strength for the differential device has been made as follows, from a viewpoint different from that of the foregoing embodiments. Incidentally, the structures of the components of the differential device D of this configuration example are the same as the structures of the components of the differential device D of the foregoing embodiments which have been described using FIGS. 1 to 6 (particularly, FIGS. 1 to 5). For this reason, the components of the configuration example will be denoted with the same reference signs as those of the embodiments, and descriptions for the structures will be omitted.

Figure 7:
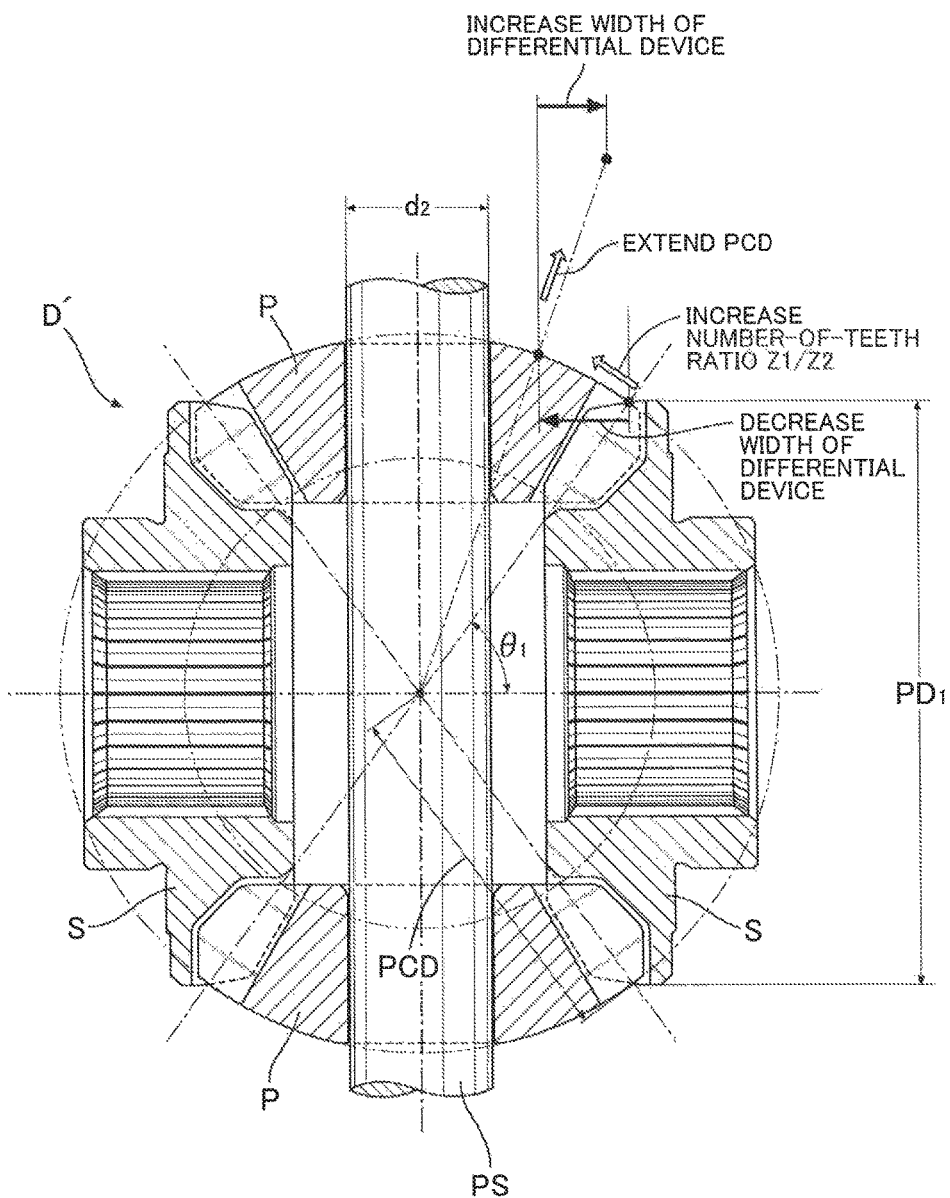
FIG. 7 is a longitudinal sectional view showing an example of a conventional differential device.

To begin with, let us explain a basic concept for sufficiently reducing the width of (i.e., thinning) the differential device D in the axial direction of the output shafts J1, J2 referring to FIG. 7 together. The concept is as follows.

Approach [1] To make the number-of-teeth ratio Z1/Z2 of the side gear S, that is, the output gear to the pinion P, that is, the differential gear larger than the number-of-teeth ratio used for the conventional existing differential device. (This leads to a decrease in the module (accordingly the tooth thickness) of the gear and a resultant decrease in the gear strength, while leading to an increase in the pitch circle diameter of the side gear S, a resultant decrease in transmission load in the meshing portion of the gear, and a resultant increase in the gear strength. However, the gear strength as a whole decreases, as discussed below.)

Approach [2] To make the pitch cone distance PCD of the pinion P larger than the pitch cone distance in the conventional existing differential device. (This leads to an increase in the module of the gear and a resultant increase in the gear strength, while leading to an increase in the pitch circle diameter of the side gear S, a resultant decrease in the transmission load in the meshing portion of the gear, and a resultant increase in the gear strength. Thus, the gear strength as a whole increases greatly, as discussed below.)

For these reasons, when the number-of-teeth ratio Z1/Z2 and the pitch cone distance PCD are set such that the amount of decrease in the gear strength based on Approach [1] is equal to the amount of increase in the gear strength based on Approach [2] or such that the amount of increase in the gear strength based on Approach [2] is greater than the amount of decrease in the gear strength based on Approach [1], the gear strength as a whole can be made equal to or greater than that of the conventional existing differential device.

Next, let us concretely examine how the gear strength changes based on Approaches [1] and [2] using mathematical expressions. Incidentally, the examination will be described in the following embodiment. First of all, a "reference differential device" is defined as a differential device D' in which the number Z1 of teeth of the side gear S is set at 14 while the number Z2 of teeth of the pinion P is set at 10. In addition, for each variable, a "change rate" is defined as a rate of change in the variable in comparison with the corresponding base number (i.e., 100%) of the reference differential device D'.

Approach [1]

When M, $PD_1$, $\theta_1$, PCD, F, and T respectively denote the module, pitch circle diameter, pitch angle, pitch cone distance, transmission load in the gear meshing portion, and transmission torque in the gear meshing portion, of the side gear S, general formulae concerning the bevel gear provide $M=PD_1/Z1$, $PD_1=PCD \cdot \sin \theta_1$, and $\theta_1 = \tan^{-1}(Z1/Z2)$.

From these expressions, the module of the gear is expressed with $$M = 2PCD \cdot \sin\{\tan^{-1}(Z1/Z2)\}/Z1 \quad (1)$$

Meanwhile, the module of the reference differential device D' is expressed with $2PCD \cdot \sin\{\tan^{-1}(7/5)\}/14$.

Dividing the term on the right side of Expression (1) by $2PCD \cdot \sin\{\tan^{-1}(7/5)\}/14$ yields a module change rate with respect to the reference differential device D', which is expressed with Expression (2) given below.

$$\text{Module Change Rate} = \frac{14 \cdot \sin\left(\tan^{-1}\frac{z1}{z2}\right)}{z1 \cdot \sin\left(\tan^{-1}\frac{7}{5}\right)} \quad (2)$$

In addition, the section modulus of the tooth portion corresponding to the gear strength (i.e., the bending strength of the tooth portion) is in proportion to the square of the tooth thickness, while the tooth thickness has a substantially linear relationship with the module M. For these reasons, the square of the module change rate corresponds to a rate of change in the section modulus of the tooth portion, accordingly a gear strength change rate. In other words, based on Expression (2) given above, the gear strength change rate is expressed with Expression (3) given below. Expression (3) is represented by a line L1 in FIG. 8 when the number Z2 of teeth of the pinion P is 10. From the line L1, it is learned that as the number-of-teeth ratio Z1/Z2 becomes larger, the module becomes smaller and the gear strength accordingly becomes lower.

$$\text{Gear Strength Change Rate} = (\text{Module Change Rate})^2 \quad (3)$$

$$= \frac{196 \cdot \sin^2\left(\tan^{-1}\frac{z1}{z2}\right)}{z1^2 \cdot \sin^2\left(\tan^{-1}\frac{7}{5}\right)}$$

Meanwhile, based on the general formulae concerning the bevel gear, a torque transmission distance of the side gear S is expressed with Expression (4) given below.

$$PD_1/2 = PCD \cdot \sin\{\tan^{-1}(Z1/Z2)\} \quad (4)$$

From the torque transmission distance $PD_1/2$, the transmission load F is given as $F=2T/PD_1$.

For this reason, when the torque T of the side gear S of the reference differential device D' is constant, the transmission load F is in inverse proportion to the pitch circle diameter $PD_1$. In addition, the rate of change in the transmission load F is in inverse proportion to the gear strength change rate. For this reason, the gear strength change rate is equal to the rate of change in the pitch circle diameter $PD_1$.

As a result, using Expression (4), the rate of change in the pitch circle diameter $PD_1$ is expressed with Expression (5) given below.

$$\text{Gear Strength Change Rate} = PD_1 \text{ Change Rate} \quad (5)$$

$$= \frac{\sin\left(\tan^{-1}\frac{z1}{z2}\right)}{\sin\left(\tan^{-1}\frac{7}{5}\right)}$$

Figure 8:
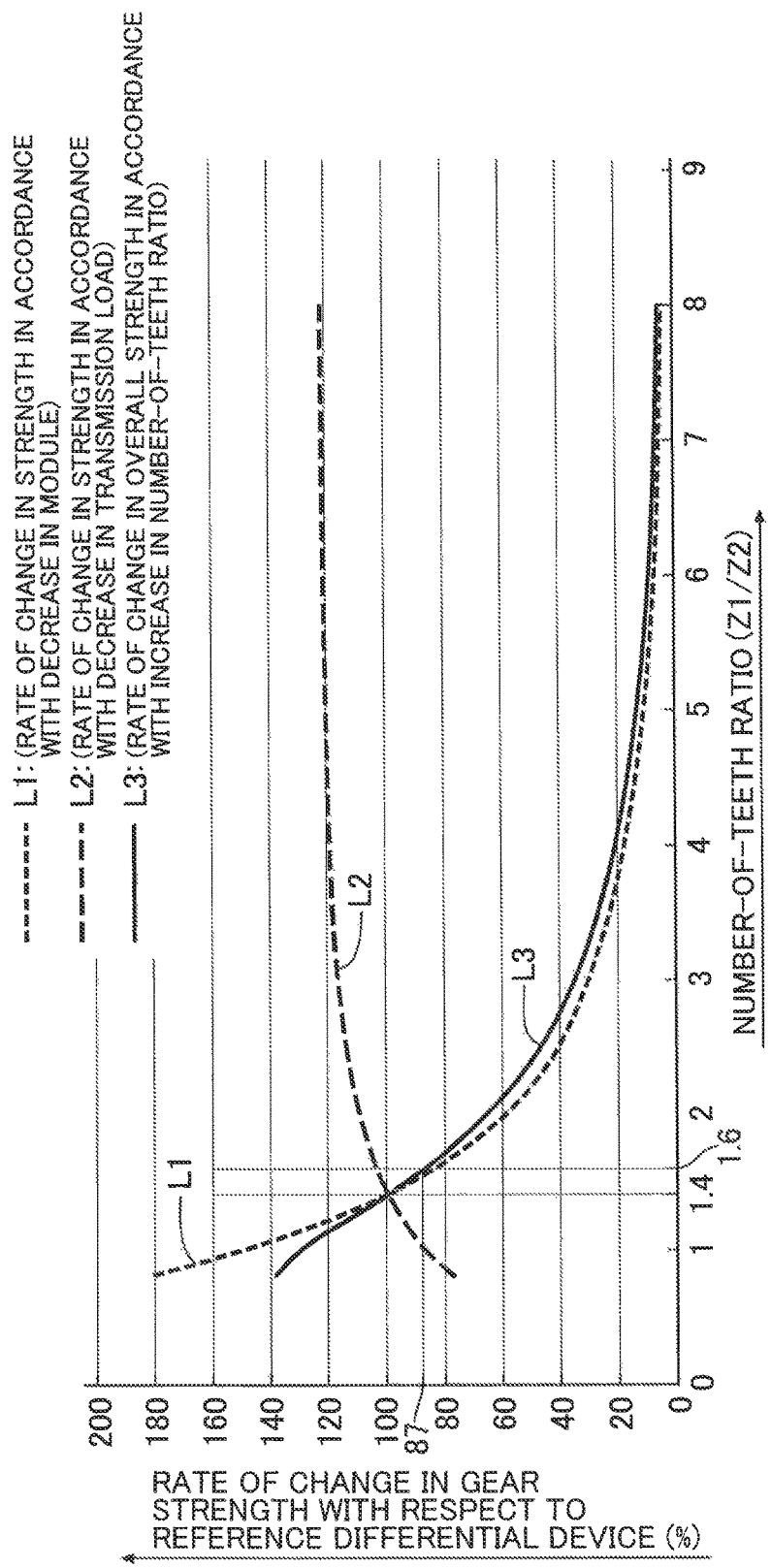
FIG. 8 is a graph showing a relationship of gear strength change rates with a number-of-teeth ratio where the number of teeth of the pinion is set at 10.

Expression (5) is represented by a line L2 in FIG. 8 when the number Z2 of teeth of the pinion P is 10. From the line L2, it is learned that as the number-of-teeth ratio Z1/Z2 becomes larger, the transmission load becomes smaller, and the gear strength accordingly becomes stronger.

Eventually, the gear strength change rate in accordance with the increase in the number-of-teeth ratio Z1/Z2 is expressed with Expression (6) given below by multiplying a rate of decrease change in the gear strength in accordance with the decrease in the module M (the term on the right side of Expression (3) shown above) and a rate of increase change in the gear strength in accordance with the decrease in the transmission load (the term on the right side of Expression (5) shown above).

$$\text{Gear Strength Change Rate in Accordance with Number-of-Teeth Ratio} = \frac{196 \cdot \sin^3\left(\tan^{-1}\frac{z1}{z2}\right)}{z1^2 \cdot \sin^3\left(\tan^{-1}\frac{7}{5}\right)} \quad (6)$$

Expression (6) is represented by a line L3 in FIG. 8 when the number Z2 of teeth of the pinion P is 10. From the line L3, it is learned that as the number-of-teeth ratio Z1/Z2 becomes larger, the gear strength as a whole becomes lower.

Approach [2]

In a case of increasing the pitch cone distance PCD of the pinion P more than the pitch cone distance in the reference differential device D', when PCD1, PCD2 respectively denote the pitch cone distance PCD before the change and the pitch cone distance PCD after the change, the module change rate in accordance with the change in the pitch cone distance PCD is expressed with

PCD2/PCD1 if the number of teeth is constant, based on the above-mentioned general formulae concerning the bevel gear.

Meanwhile, as being clear from the above-discussed process for deriving Expression (3), the gear strength change rate of the side gear S corresponds to the square of the module change rate. For this reason, $$\text{Gear Strength Change Rage in Accordance with Increase in Module} = (PCD2/PCD1)^2 \quad (7)$$

is obtained. Expression (7) is represented by a line L4 in FIG. 9. From the line L4, it is learned that as the pitch cone distance PCD becomes larger, the module becomes larger, and the gear strength accordingly becomes stronger.

In addition, when the pitch cone distance PCD is made larger than the pitch cone distance PCD1 in the reference differential device D', the transmission load F decreases. Thereby, the gear strength change rate becomes equal to the rate of change in the pitch circle diameter $PD_1$, as described above. In addition, the pitch circle diameter $PD_1$ of the side gear S is in proportion to the pitch cone distance PCD. For these reasons, $$\text{Gear Strength Change Rate in Accordance with Decrease in Transmission Load} = PCD2/PCD1 \quad (8)$$

is obtained.

Figure 9:
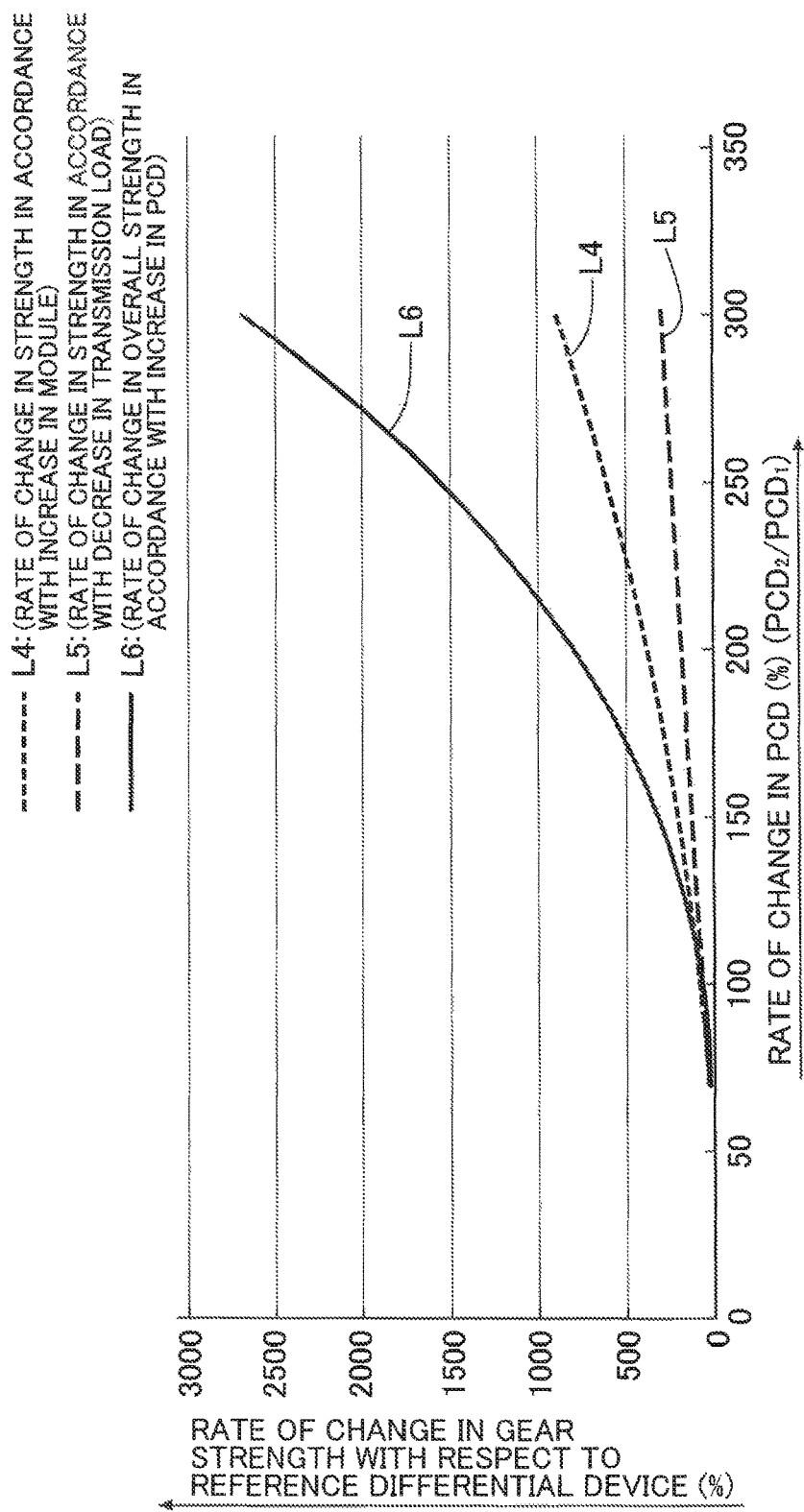
FIG. 9 is a graph showing a relationship of the gear strength change rates with a pitch cone distance change rate.

Expression (8) is represented by a line L5 in FIG. 9. From the line L5, it is learned that as the pitch cone distance PCD becomes larger, the transmission load becomes lower, and the gear strength accordingly becomes stronger.

In addition, the gear strength change rate in accordance with the increase in the pitch cone distance PCD is expressed with Expression (9) given below by multiplying the rate of increase change in the gear strength in accordance with the increase in the module M (the term on the right side of Expression (7) shown above) and the rate of increase change in the gear strength in accordance with the decrease in the transmission load in response to the increase in the pitch circle diameter PD (the term on the right side of Expression (8) shown above).

$$\text{Gear Strength Change Rate in Accordance with Increase in Pitch Cone Distance} = (PCD2/PCD1)^3 \quad (9)$$

Expression (9) is represented by a line L6 in FIG. 9. From the line L6, it is learned that as the pitch cone distance PCD becomes larger, the gear strength is increased greatly.

With these taken into consideration, the combination of the number-of-teeth ratio Z1/Z2 and the pitch cone distance PCD is determined such that: the decrease in the gear strength based on Approach [1] given above (the increase in the number-of-teeth ratio) is sufficiently compensated for by the increase in the gear strength based on Approach [2] given above (the increase in the pitch cone distance) so as to make the overall gear strength of the differential device equal to or greater than the gear strength of the conventional existing differential device.

For example, 100% of the gear strength of the side gear S of the reference differential device D' can be kept by setting the gear strength change rate in accordance with the increase in the number-of-teeth ratio (i.e., the term on the right side of Expression (6) given above) obtained based on Approach [1] given above and the gear strength change rate in accordance with the increase in the pitch cone distance (i.e., the term on the right side of Expression (9) given above) obtained based on Approach [2] given above, such that the multiplication of these gear strength change rates becomes equal to 100%. Thereby, the relationship between the number-of-teeth ratio Z1/Z2 and the rate of change in the pitch cone distance PCD for keeping 100% of the gear strength of the reference differential device D' can be obtained from Expression (10) given below. Expression (10) is represented by a line L7 in FIG. 10 when the number Z2 of teeth of the pinion P is 10.

$$PCD2/PCD1 = \left(100\% \Big/ \begin{array}{c} \text{Gear Strength Change Rate} \\ \text{in Accordance with} \\ \text{Number-of-Teeth Ratio} \end{array}\right)^{\frac{1}{3}} \quad (10)$$

$$= \left\{ \frac{1}{\dfrac{196 \cdot \sin^3\left(\tan^{-1}\dfrac{z1}{z2}\right)}{z1^2 \cdot \sin^3\left(\tan^{-1}\dfrac{7}{5}\right)}} \right\}^{\frac{1}{3}}$$

$$= \left(\frac{z1}{14}\right)^{\frac{2}{3}} \cdot \frac{\sin\left(\tan^{-1}\dfrac{7}{5}\right)}{\sin\left(\tan^{-1}\dfrac{z1}{z2}\right)}$$

Figure 10:
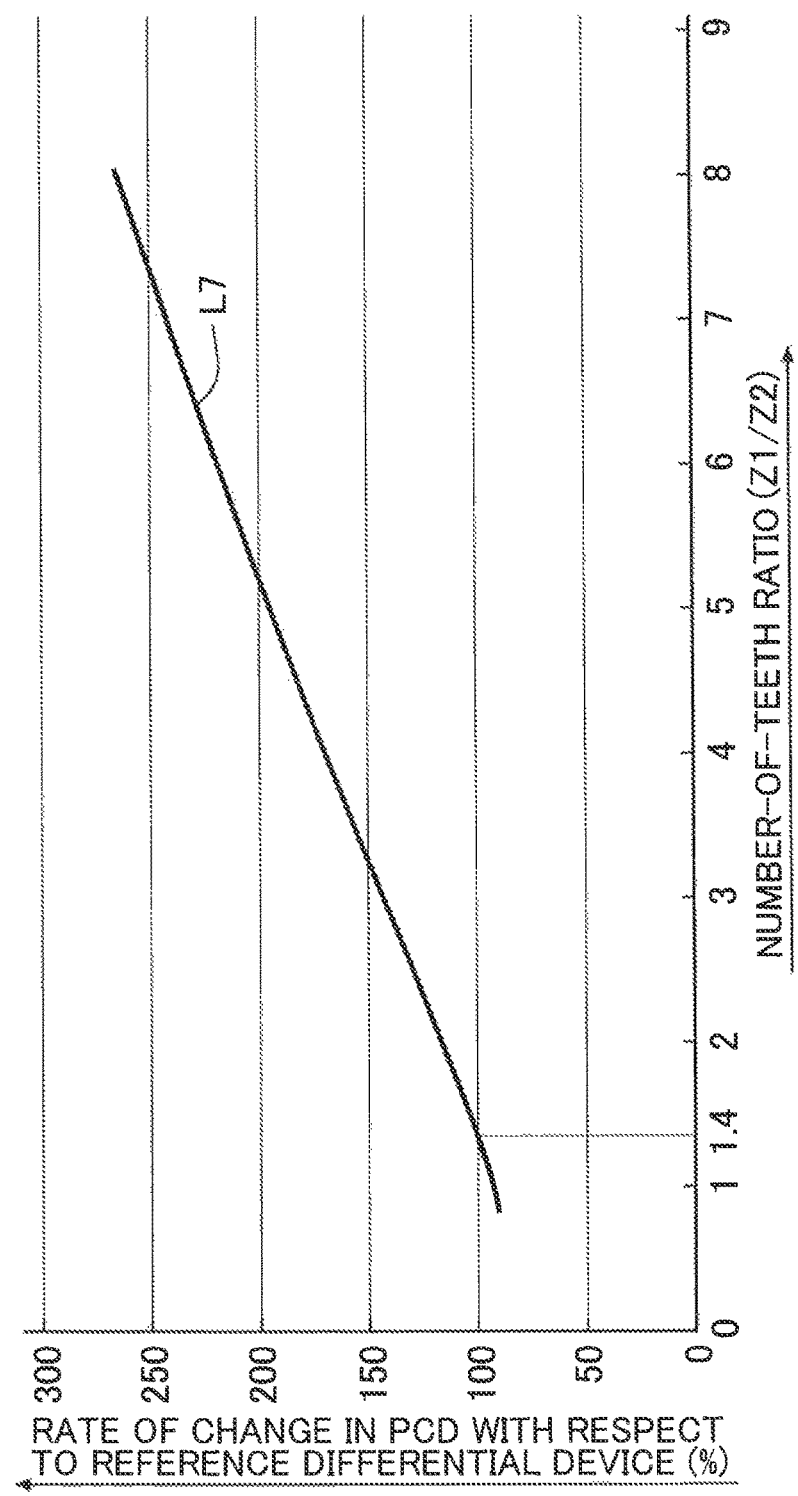
FIG. 10 is a graph showing a relationship of the pitch cone distance change rate with the number-of-teeth ratio for keeping 100% of the gear strength where the number of teeth of the pinion is set at 10.

Like this, Expression (10) represents the relationship between the number-of-teeth ratio Z1/Z2 and the rate of change in the pitch cone distance PCD for keeping 100% of the gear strength of the reference differential device D' when the number-of-teeth ratio Z1/Z2 is equal to 14/10 (see FIG. 10). The rate of change in the pitch cone distance PCD represented by the vertical axis in FIG. 10 can be converted into a ratio of d2/PCD where d2 denotes a shaft diameter of the pinion shaft PS (i.e., the pinion support portion) supporting the pinion P.

TABLE 1

| PCD | SHAFT DIAMETER (d2) | d2/PCD |
|---|---|---|
| 31 | 13 | 42% |
| 35 | 15 | 43% |
| 38 | 17 | 45% |
| 39 | 17 | 44% |
| 41 | 18 | 44% |
| 45 | 18 | 40% |

To put it concretely, in the conventional existing differential device, the increase change in the pitch cone distance PCD correlates with the increase change in the shaft diameter d2 as shown in Table 1, and can be represented by a decrease in the ratio of d2/PCD when d2 is constant. In addition, in the conventional existing differential device, d2/PCD falls within a range of 40% to 45% as shown in Table 1 given above when the conventional existing differential device is the reference differential device D', and the gear strength increases as the pitch cone distance PCD increases. Judging from these, the gear strength of the differential device can be made equal to or greater than the gear strength of the conventional existing differential device by determining the shaft diameter d2 of the pinion shaft PS and the pitch cone distance PCD such that at least d2/PCD is equal to or less than 45%, when the differential device is the reference differential device D'. In other words, when the differential device is the reference differential device D', it suffices if d2/PCD≤0.45 is satisfied. In this case, when PCD2 denotes the pitch cone distance PCD which is changed to become larger or less than the pitch cone distance PCD1 of the reference differential device D', it suffices if $$d2/PCD2 \leq 0.45/(PCD2/PCD1) \quad (11)$$

is satisfied. Furthermore, the application of Expression (11) to Expression (10) given above can convert the relationship between d2/PCD and the number-of-teeth ratio Z1/Z2 into Expression (12) given below.

$$d2/PCD \leq 0.45/(PCD2/PCD1) \quad (12)$$

$$= 0.45 / \left\{ \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\}$$

$$= 0.45 \cdot \left(\frac{14}{z1}\right)^{\frac{2}{3}} \cdot \frac{\sin\left(\tan^{-1}\frac{z1}{z2}\right)}{\sin\left(\tan^{-1}\frac{7}{5}\right)}$$

Figure 11:
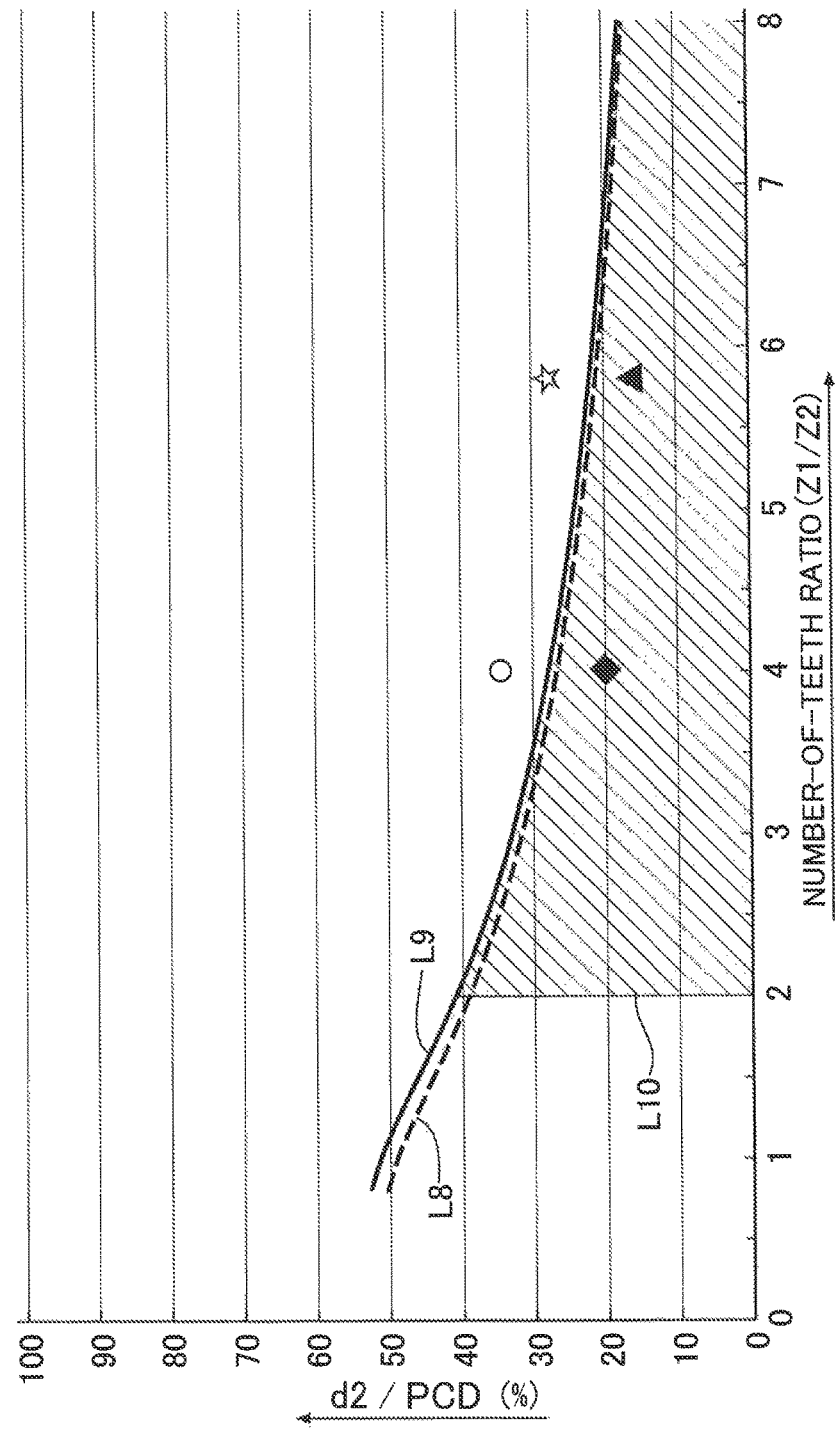
FIG. 11 is a graph showing a relationship between a shaft diameter/pitch cone distance ratio and the number-of-teeth ratio where the number of teeth of the pinion is set at 10.

When the Expression (12) is equal, Expression (12) can be represented by a line L8 in FIG. 11 if the number Z2 of teeth of the pinion P is 10. When the Expression (12) is equal, the relationship between d2/PCD and the number-of-teeth ratio Z1/Z2 keeps 100% of the gear strength of the reference differential device D'.

Meanwhile, in conventional existing differential devices, usually, not only the number-of-teeth ratio Z1/Z2 equal to 1.4 used above to explain the reference differential device D' but also the number-of-teeth ratio Z1/Z2 equal to 1.6 or 1.44 is adopted. This needs to be taken into consideration. Based on the assumption that the reference differential device D' (Z1/Z2=1.4) guarantee the necessary and sufficient gear strength, that is, 100% of gear strength, it is learned, as being clear from FIG. 8, that the gear strength of conventional existing differential devices in which the number-of-teeth ratio Z1/Z2 is 16/10 is as low as 87% of the gear strength of the reference differential device D'. The general practice, however, is that the gear strength low at that level is accepted as practical strength and actually used for conventional existing differential devices. Judging from this, one may consider that gear strength which needs to be sufficiently secured for and is acceptable for the differential device which is thinned in the axial direction is at least equal to, or greater than, 87% of the gear strength of the reference differential device D'.

From the above viewpoint, first, a relationship for keeping 87% of the gear strength of the reference differential device D' is obtained between the number-of-teeth ratio Z1/Z2 and the rate of change in the pitch cone distance PCD. The relationship can be expressed with Expression (10') given below by performing a calculation by emulating the process of deriving Expression (10) given above (i.e., a calculation such that the multiplication of the gear strength change rate in accordance with the increase in the number-of-teeth ratio (i.e., the term on the right side of Expression (6) given above) and the gear strength change rate in accordance with the increase in the pitch cone distance (i.e., the term on the right side of Expression (9) given above) becomes equal to 87%).

$$PCD2/PCD1 = \left(87\% / \frac{\text{Gear Strength Change Rate}}{\text{in Accordance with Number-of-Teeth Ratio}}\right)^{\frac{1}{3}} \quad (10')$$

$$= \left\{\frac{0.87}{\left\{\frac{196 \cdot \sin^3\left(\tan^{-1}\frac{z1}{z2}\right)}{z1^2 \cdot \sin^3\left(\tan^{-1}\frac{7}{5}\right)}\right\}}\right\}^{\frac{1}{3}}$$

$$= 0.87^{\frac{1}{3}} \cdot \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)}$$

Thereafter, when Expression (11) given above is applied to Expression (10') given above, the relationship between d2/PCD and the number-of-teeth ratio Z1/Z2 for keeping 87% or more of the gear strength of the reference differential device D' can be converted into Expression (13) given below. However, the calculation is performed using the following rules that: the number of significant figures is three for all the factors, except for factors expressed with variables; digits below the third significant figure are rounded down; and although the result of the calculation cannot avoid approximation by an calculation error, the mathematical expression uses the equals sign because the error is negligible.

$$d2/PCD \leq 0.45 / \left\{ 0.87^{\frac{1}{3}} \cdot \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\} \quad (13)$$

$$= 3.36 \cdot \left(\frac{1}{z1}\right)^{\frac{2}{3}} \cdot \sin\left(\tan^{-1}\frac{z1}{z2}\right)$$

When the Expression (13) is equal, Expression (13) can be represented by FIG. 11 (more specifically, by a line L9 in FIG. 11) if the number Z2 of teeth of the pinion P is 10. In this case, an area corresponding to Expression (13) is an area on and under the line L9 in FIG. 11. In addition, a specific area (a hatched area in FIG. 11) satisfying Expression (13) and located on the right side of a line L10 in FIG. 11 where the number-of-teeth ratio Z1/Z2>2.0 is satisfied is an area for setting Z1/Z2 and d2/PCD which enable at least 87% or more of the gear strength of the reference differential device D' to be secured particularly for the differential device thinned in the axial direction where the number Z2 of teeth of the pinion P is 10 and the number-of-teeth ratio Z1/Z2 is greater than 2.0. For reference, a black diamond in FIG. 11 represents an example where the number-of-teeth ratio Z1/Z2 and d2/PCD are set at 40/10 and 20.00%, respectively, and a black triangle in FIG. 11 represents an example where the number-of-teeth ratio Z1/Z2 and d2/PCD are set at 58/10 and 16.67%, respectively. These examples fall within the specific area. A result of a simulation for strength analysis on these examples has confirmed that the gear strength equal to or greater than those of the conventional differential devices (more specifically, the gear strength equal to or greater than 87% of the gear strength of the reference differential device D') were obtained.

Thus, the thinned differential device falling within the specific area is configured as the differential device which, as a whole, is sufficiently reduced in width in the axial direction of the output shafts while securing the gear strength (for example, static torsion load strength) and the maximum amount of torque transmission at approximately the same levels as the conventional existing differential devices which are not thinned in the axial direction thereof. Accordingly, it is possible to achieve effects of: being capable of easily incorporating the differential device in a transmission system, which is under many layout restrictions around the differential device, with great freedom and no specific difficulties; being extremely advantageous in reducing the size of the transmission system; and the like.

In addition, when preferably, $Z1/Z2 \geq 4$ is satisfied and more preferably, $Z1/Z2 \geq 5.8$ is satisfied, the differential device can be sufficiently reduced in width in the axial direction of the output shafts while securing the gear strength (for example, the static torsion load strength) and the maximum amount of torque transmission at approximately the same levels as the conventional existing differential devices which are not thinned.

Moreover, when the thinned differential device in the specific area has, for example, the structure of the foregoing embodiments (more specifically, the structures shown in FIGS. 1 to 6), the thinned differential device in the specific area can obtain an effect derived from the structure shown in the foregoing embodiments.

Figure 12:
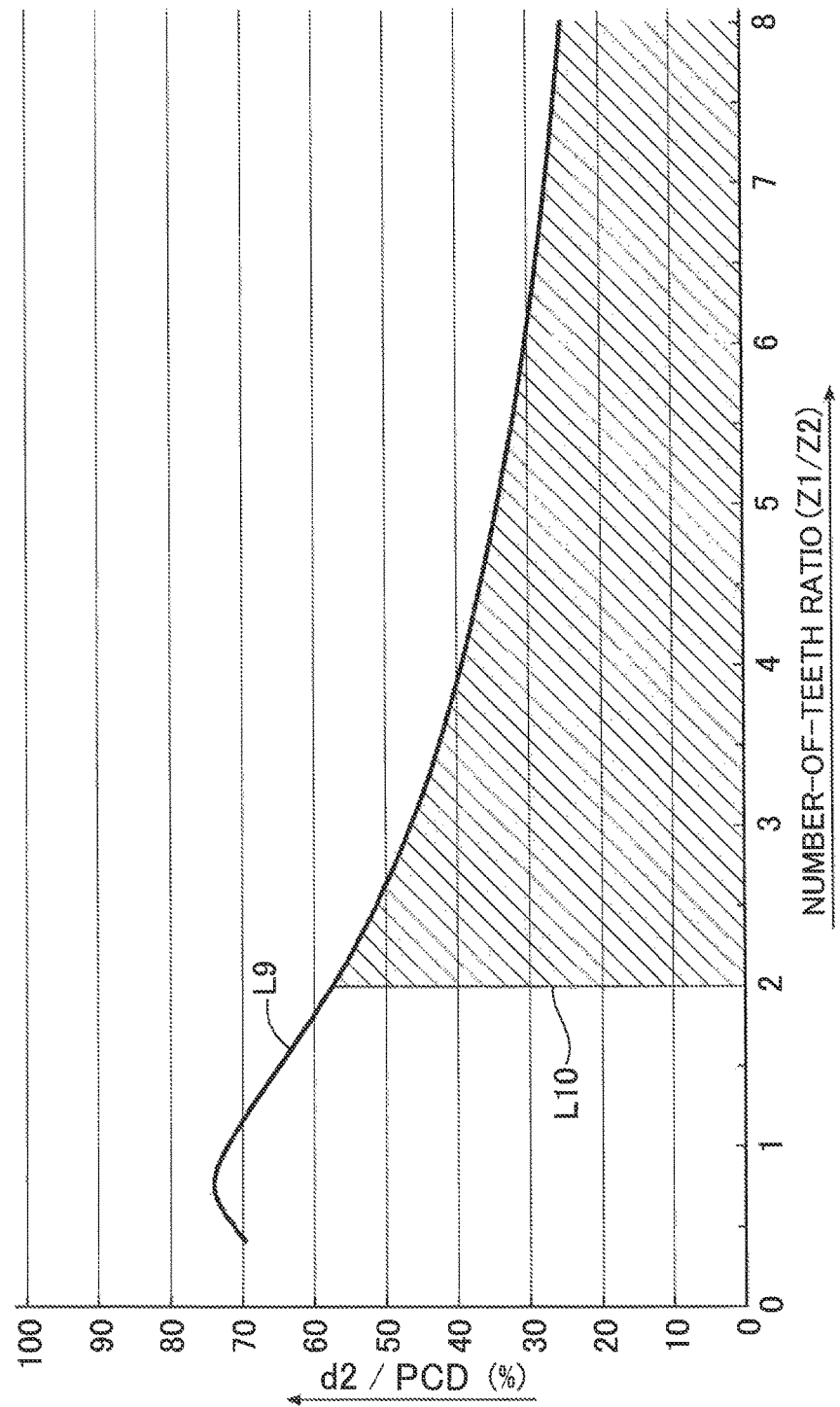
FIG. 12 is a graph showing a relationship between the shaft diameter/pitch cone distance ratio and the number-of-teeth ratio where the number of teeth of the pinion is set at 6.

It should be noted that although the foregoing descriptions (the descriptions in connection with FIGS. 8, 10, 11 in particular) have been provided for the differential device in which the number Z2 of teeth of the pinion P is set at 10, the present invention is not limited to this. For example, when the number Z2 of teeth of the pinion P is set at 6, 12 and 20, too, the thinned differential device capable of achieving the above effects can be represented by Expression (13), as shown by hatched areas in FIGS. 12, 13 and 14. In other words, Expression (13) derived in the above-described manner is applicable regardless of the change in the number Z2 of teeth of the pinion P. For example, even when the number Z2 of teeth of the pinion P is set at 6, 12 and 20, the above effects can be obtained by setting the number Z1 of teeth of the side gear S, the number Z2 of teeth of the pinion P, the shaft diameter d2 of the pinion shaft PS and the pitch cone distance PCD such that Expression (13) is satisfied, like in the case where the number Z2 of teeth of the pinion P is set at 10.

Figure 13:
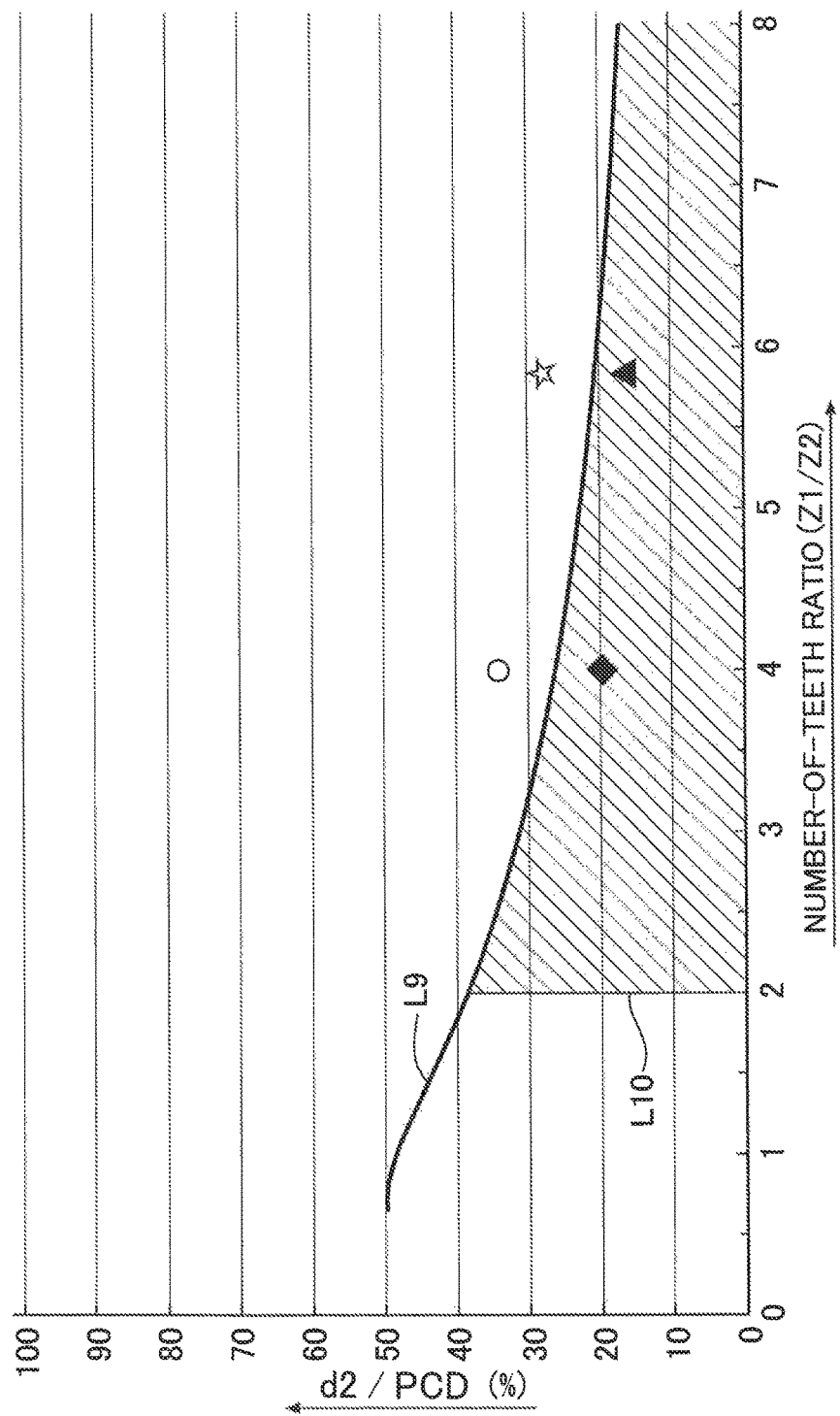
FIG. 13 is a graph showing a relationship between the shaft diameter/pitch cone distance ratio and the number-of-teeth ratio where the number of teeth of the pinion is set at 12.
Figure 14:
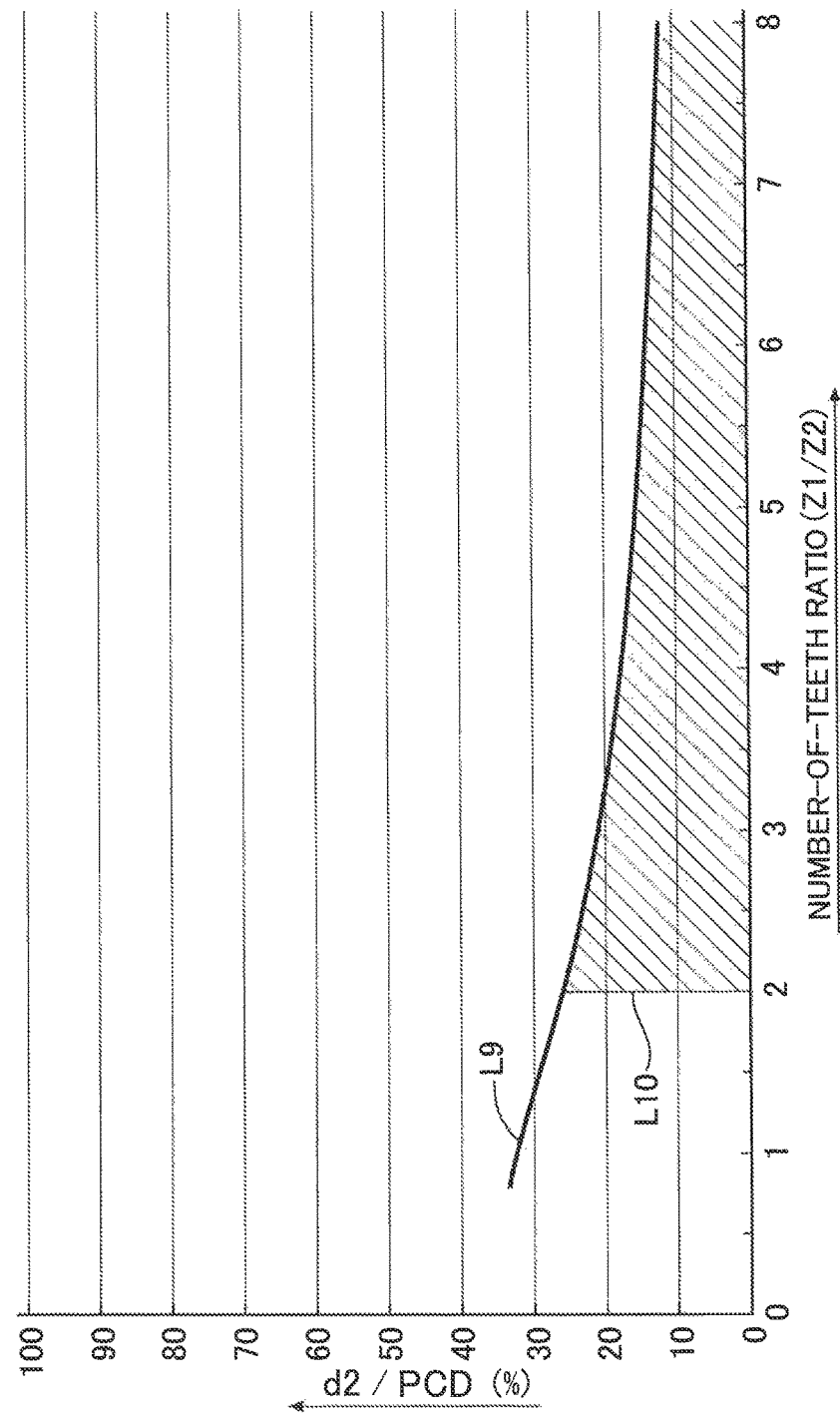
FIG. 14 is a graph showing a relationship between the shaft diameter/pitch cone distance ratio and the number-of-teeth ratio where the number of teeth of the pinion is set at 20.

Furthermore, for reference, a black diamond in FIG. 13 represents an example where when the number Z2 of teeth of the pinion P is 12, the number-of-teeth ratio Z1/Z2 and d2/PCD are set at 48/12 and 20.00%, respectively, and a black triangle in FIG. 13 represents an example where when the number Z2 of teeth of the pinion P is 12, the number-of-teeth ratio Z1/Z2 and d2/PCD are set at 70/12 and 16.67%, respectively. A result of a simulation for strength analysis on these examples has confirmed that the gear strength equal to or greater than those of the conventional differential devices (more specifically, the gear strength equal to or greater than 87% of the gear strength of the reference differential device D') were obtained. Moreover, these examples fall within the specific area, as shown in FIG. 13.

As comparative examples, let us show examples which do not fall within the specific area. A white star in FIG. 11 represents an example where when the number Z2 of teeth of the pinion P is for example 10, the number-of-teeth ratio Z1/Z2 and d2/PCD are set at 58/10 and 27.50%, respectively, and a white circle in FIG. 11 represents an example where when the number Z2 of teeth of the pinion P is for example 10, the number-of-teeth ratio Z1/Z2 and d2/PCD are set at 40/10 and 34.29%, respectively. A white star in FIG. 13 represents an example where when the number Z2 of teeth of the pinion P is for example 12, the number-of-teeth ratio Z1/Z2 and d2/PCD are set at 70/12 and 27.50%, respectively, and a white circle in FIG. 13 represents an example where when the number Z2 of teeth of the pinion P is for example 12, the number-of-teeth ratio Z1/Z2 and d2/PCD are set at 48/12 and 34.29%, respectively. A result of a simulation for strength analysis on these examples has confirmed that the gear strength equal to or greater than those of the conventional differential devices (more specifically, the gear strength equal to or greater than 87% of the gear strength of the reference differential device D') were not obtained. In other words, the above effects cannot be obtained from the examples which do not fall within the specific area.

Although the embodiments of the present invention have been described, the present invention is not limited to the foregoing embodiments. Various design changes may be made to the present invention within a scope not departing from the gist of the present invention.

For example, the foregoing embodiments have been shown in which the differential device D allows the difference in rotational speed between the left and right axles. However, the differential device of the present invention may be carried out as a center differential configured to absorb the difference in rotational speed between front wheels and rear wheels.

In addition, the foregoing embodiments have been shown in which the tip end portions of the plurality of arm portions 23a of the carrier 23 (the protrusions 23af each having the flange shape, more specifically) are directly welded as at w to the differential case DC (the first cover portion C1, more specifically). However, in the present invention, a second carrier base differing from the carrier base 23b and having an annular shape may be integrally joined to the tip end portions of the plurality of arm portions 23a, and the end portion in the axial direction of the carrier 23, that is, the end portion of the second carrier base, may be welded as at w to the differential case DC.

Furthermore, the foregoing embodiments have been shown in which the step portion 15 provided in the recess shape to the side surface on the carrier 23 side of the outer peripheral end portion DCo of the differential case DC (the first cover portion C1, more specifically) is continuously formed in the annular shape along the entire periphery of the differential case DC. However, in the present invention, a plurality of step portions each having an arc shape may be formed and arranged at intervals in the peripheral direction. In this case, it is possible to reduce thickness and weight of the differential case DC while securing the strength of the differential case DC by minimizing a decrease in the strength of the differential case DC due to the providing of the step portion 15 to the differential case DC.

Moreover, the foregoing embodiments have been shown in which the recessed portions 16 formed in the side surface on the carrier 23 side of the differential case DC (the first cover portion C1, more specifically) so as to be adjacent to the step portion 15 are formed from the plurality of recessed portions 16 each having the arc shape and respectively corresponding to the plurality of arm portions 23a of the carrier 23. However, in the present invention, the recessed portions 16 may be replaced with a single recessed portion having an annular shape (that is, an annular groove) which continues in the peripheral direction.

What is claimed is:

1. A differential device comprising: an input member capable of being joined to a carrier supporting a planetary gear inputted with driving force; a differential gear supported by the input member and being able to rotate with respect to the input member and revolve around a rotation center of the input member; and a pair of output gears each meshing with the differential gear, wherein the input member includes a step portion in a side surface on the carrier side of an outer peripheral end portion of the input member, the step portion being recessed in a direction opposite to the carrier, extending to a radially-outer end surface of the outer peripheral end portion and being capable of abutting against the carrier, and as seen in a projection plane orthogonal to a rotation axis of each of the planetary gears, the step portion is formed in a position not overlapping the planetary gear.

2. The differential device according to claim 1, wherein the step portion and the carrier are joined together by welding, and a welding portion between the step portion and the carrier is included in the outer peripheral end portion of the input member.

3. The differential device according to claim 2, wherein the input member includes a recessed portion adjacent to a radially-inner side of the step portion and deeper than the step portion, the carrier includes an arm portion between each adjacent pair of a plurality of the planetary gears arranged in a peripheral direction of the carrier, and the recessed portion extends peripherally outward of at least one end in the peripheral direction of the arm portion.

4. The differential device according to claim 3, wherein a plurality of the recessed portions are arranged at intervals in the peripheral direction.

5. The differential device according to claim 4, wherein as seen in a projection plane orthogonal to a rotation axis of each of the planetary gears, the step portion is formed in a position not overlapping the planetary gear.

6. The differential device according to claim 2, wherein as seen in a projection plane orthogonal to a rotation axis of each of the planetary gears, the step portion is formed in a position not overlapping the planetary gear.

7. The differential device according to claim 3, wherein as seen in a projection plane orthogonal to a rotation axis of each of the planetary gears, the step portion is formed in a position not overlapping the planetary gear.

8. The differential device according to claim 1, wherein the input member includes a recessed portion adjacent to a radially-inner side of the step portion and deeper than the step portion, the carrier includes an arm portion between each adjacent pair of a plurality of the planetary gears arranged in a peripheral direction of the carrier, and the recessed portion extends peripherally outward of at least one end in the peripheral direction of the arm portion.

9. The differential device according to claim 8, wherein a plurality of the recessed portions are arranged at intervals in the peripheral direction.

10. The differential device according to claim 9, wherein as seen in a projection plane orthogonal to a rotation axis of each of the planetary gears, the step portion is formed in a position not overlapping the planetary gear.

11. The differential device according to claim 8, wherein as seen in a projection plane orthogonal to a rotation axis of each of the planetary gears, the step portion is formed in a position not overlapping the planetary gear.

12. The differential device according to claim 1, wherein a plurality of the step portions are arranged at intervals in the peripheral direction.

13. The differential device according to claim 1, wherein the input member includes a recessed portion adjacent to the radially-inner side of the step portion and deeper than the step portion, and the recessed portion is formed using a forging die.

14. The differential device according to claim 1, further comprising a differential gear support portion supporting the differential gear and supported in the input member, wherein $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and

Z1/Z2>2 is satisfied, where Z1, Z2, d2 and PCD denote the number of teeth of each of the output gears, the number of teeth of the differential gear, a diameter of the differential gear support portion and a pitch cone distance, respectively.

15. The differential device according to claim 14, wherein Z1/Z2≥4 is satisfied.

16. The differential device according to claim 14, wherein Z1/Z2≥5.8 is satisfied.

* * * * *